United States Patent
Aurongzeb et al.

(10) Patent No.: US 10,403,189 B2
(45) Date of Patent: Sep. 3, 2019

(54) COMPENSATING FOR TEMPERATURE INDUCED DIFFERENCES IN A COMPUTING DEVICE HAVING DUAL-DISPLAYS OR A FOLDABLE DISPLAY

(71) Applicant: Dell Products L. P., Round Rock, TX (US)

(72) Inventors: Deeder M. Aurongzeb, Austin, TX (US); Joohyun Woo, Round Rock, TX (US); Claire Hao Wen Hsu, McKinney, TX (US)

(73) Assignee: Dell Products L.P., Round Rock, TX (US)

( * ) Notice: Subject to any disclaimer, the term of this patent is extended or adjusted under 35 U.S.C. 154(b) by 34 days.

(21) Appl. No.: 15/847,195

(22) Filed: Dec. 19, 2017

(65) Prior Publication Data

US 2019/0189042 A1    Jun. 20, 2019

(51) Int. Cl.
*G09G 3/20* (2006.01)
*G06F 3/14* (2006.01)
(Continued)

(52) U.S. Cl.
CPC ......... *G09G 3/2003* (2013.01); *G06F 1/1618* (2013.01); *G06F 1/1637* (2013.01); *G06F 1/1681* (2013.01); *G06F 1/203* (2013.01); *G06F 3/1423* (2013.01); *G09G 3/3208* (2013.01); *G09G 2320/0242* (2013.01); *G09G 2320/041* (2013.01); *G09G 2320/0626* (2013.01); *G09G 2320/0666* (2013.01); *G09G 2320/08* (2013.01); *G09G 2330/021* (2013.01); *G09G 2340/0407* (2013.01); *G09G 2360/144* (2013.01)

(58) Field of Classification Search
CPC ............... G09G 3/2003; G09G 3/3208; G09G 2320/0242; G09G 2320/41; G09G 2330/021; G06F 1/1618; G06F 1/1637; G06F 1/1681; G06F 11/3058
See application file for complete search history.

(56) References Cited

U.S. PATENT DOCUMENTS

2009/0171612 A1 *  7/2009  Dhanekula .......... G06F 11/3006
                                                 702/122
2015/0169016 A1 *  6/2015  Doshi ................... G06F 1/3203
                                                 713/320
(Continued)

*Primary Examiner* — Antonio A Caschera
(74) *Attorney, Agent, or Firm* — Campbell Stephenson LLP; Shiv S. Naimpally

(57) ABSTRACT

In some examples, a computing device includes a first display in a first housing and a second display in a second housing. The computing device may determine an angle between the first display device and the second display device, determine a first temperature map of the first housing based on the angle and first temperature data received from a first set of temperature sensors in the first housing, and determine a second temperature map of the second housing based on the angle and second temperature data received from a second set of temperature sensors in the second housing. The computing device may determine a temperature difference between the first display device and the second display device, determine a remedial action, and perform the remedial action to reduce the temperature, color, and/or color intensity difference between the first display device and the second display device.

20 Claims, 12 Drawing Sheets

(51) Int. Cl.
*G06F 1/16* (2006.01)
*G06F 1/20* (2006.01)
*G09G 3/3208* (2016.01)

(56) References Cited

U.S. PATENT DOCUMENTS

2016/0048363 A1* 2/2016 North .................... G06F 1/1616
　　　　　　　　　　　　　　　　　　　　　　345/1.1
2018/0089048 A1* 3/2018 Zou ......................... G06F 1/206
2018/0164854 A1* 6/2018 Wood .................... G06F 1/1677

* cited by examiner

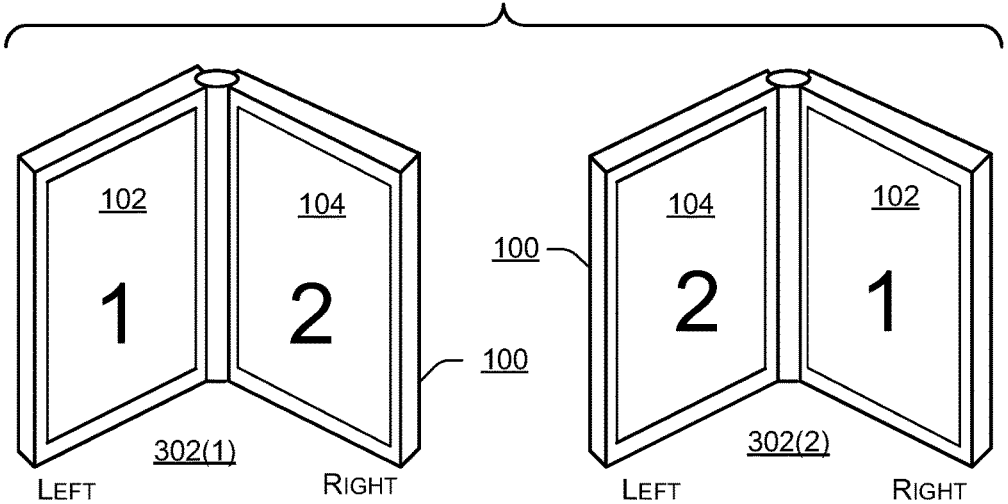
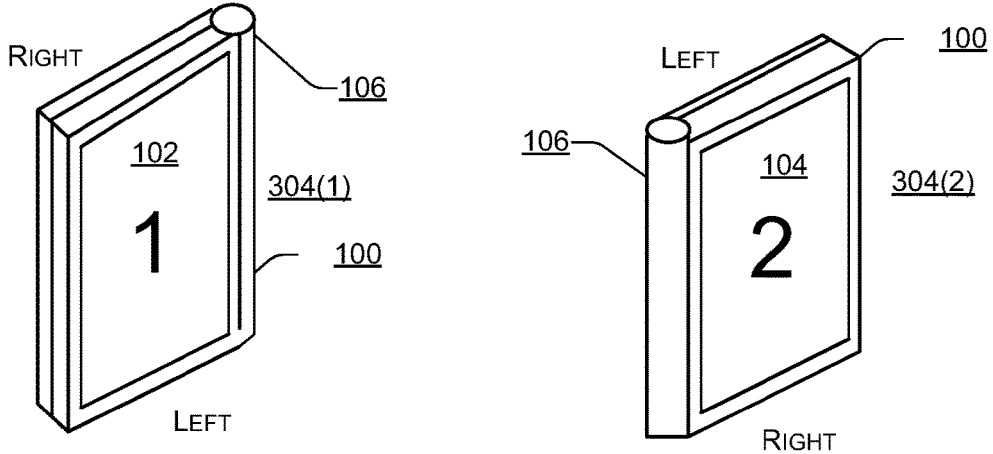
FIG. 3

1100

```
┌─────────────────────────────────────────────────────────────┐
│ DETERMINE ANGLE BETWEEN FIRST DISPLAY DEVICE AND SECOND     │
│ DISPLAY DEVICE                                              │
│ 1102                                                        │
└─────────────────────────────────────────────────────────────┘
                              ▼
┌─────────────────────────────────────────────────────────────┐
│ DETERMINE AN AMOUNT OF RADIATED HEAT BEING RECEIVED BY THE  │
│ FIRST DISPLAY AND BY THE SECOND DISPLAY                     │
│ 1104                                                        │
└─────────────────────────────────────────────────────────────┘
                              ▼
┌─────────────────────────────────────────────────────────────┐
│ DETERMINE A FIRST TEMPERATURE OF A FIRST HOUSING AND A      │
│ SECOND TEMPERATURE OF A SECOND HOUSING                      │
│ 1106                                                        │
└─────────────────────────────────────────────────────────────┘
                              ▼
┌─────────────────────────────────────────────────────────────┐
│ DETERMINE A FIRST TEMPERATURE MAP OF THE FIRST HOUSING AND  │
│ A SECOND TEMPERATURE MAP OF THE SECOND HOUSING              │
│ 1108                                                        │
└─────────────────────────────────────────────────────────────┘
                              ▼
┌─────────────────────────────────────────────────────────────┐
│ DETERMINE FIRST AMBIENT LIGHTING ASSOCIATED WITH FIRST      │
│ DISPLAY DEVICE                                              │
│ 1110                                                        │
└─────────────────────────────────────────────────────────────┘
                              ▼
┌─────────────────────────────────────────────────────────────┐
│ DETERMINE SECOND AMBIENT LIGHTING ASSOCIATED WITH SECOND    │
│ DISPLAY DEVICE                                              │
│ 1112                                                        │
└─────────────────────────────────────────────────────────────┘
                              ▼
┌─────────────────────────────────────────────────────────────┐
│ DETERMINE DIFFERENCES IN COLOR AND COLOR INTENSITY BETWEEN  │
│ FIRST DISPLAY DEVICE AND SECOND DISPLAY DEVICE              │
│ 1114                                                        │
└─────────────────────────────────────────────────────────────┘
                              ▼
┌─────────────────────────────────────────────────────────────┐
│ DETERMINE REMEDIAL ACTION(S)                                │
│ 1116                                                        │
└─────────────────────────────────────────────────────────────┘
                              ▼
┌─────────────────────────────────────────────────────────────┐
│ PERFORM REMEDIAL ACTION(S) TO REDUCE DIFFERENCES IN         │
│ TEMPERATURE, COLOR, AND COLOR INTENSITY                     │
│ 1118                                                        │
└─────────────────────────────────────────────────────────────┘
```

FIG. 11

COMPENSATING FOR TEMPERATURE INDUCED DIFFERENCES IN A COMPUTING DEVICE HAVING DUAL-DISPLAYS OR A FOLDABLE DISPLAY

BACKGROUND OF THE INVENTION

Field of the Invention

This invention relates generally to computing devices and, more particularly, to providing a same perceived appearance (e.g., in terms of color balance) among multiple display devices of a portable computing device that includes two (or more) display devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A portable computing device (e.g. a tablet or a wireless phone) may include a display panel, such as, for example, a light emitting diode (LED) panel or an organic LED (OLED) panel. The colors and the intensity of the colors displayed by the display panel may vary depending on the temperature. For example, the computer components that are placed in the same housing as the display panel may generate heat. The colors and the intensity of the colors displayed by the display panel may change based on the internal temperature in the housing. In addition, certain types of display panels, such as OLED, may use a metal layer that may absorb and retain heat, exacerbating heat-induced color and color intensity variations.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device includes a first display in a first housing and a second display in a second housing. The computing device may determine an angle between the first display device and the second display device, determine a first temperature map of the first housing based on the angle and first temperature data received from a first set of temperature sensors in the first housing, and determine a second temperature map of the second housing based on the angle and second temperature data received from a second set of temperature sensors in the second housing. The computing device may determine a temperature difference, a color difference, or other difference between the first display device and the second display device, determine a remedial action, and perform the remedial action to reduce the temperature difference between the first display device and the second display device. Reducing the temperature difference may reduce the color difference between the display devices and increase a performance, quality, and longevity of each display device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 3 is a block diagram illustrating modes of a dual-display device in a vertical orientation according to some embodiments.

FIG. 11 is a flowchart of a process that includes performing remedial actions to reduce differences in color and/or color intensity between two display devices according to some embodiments.

DETAILED DESCRIPTION

Figure 1:
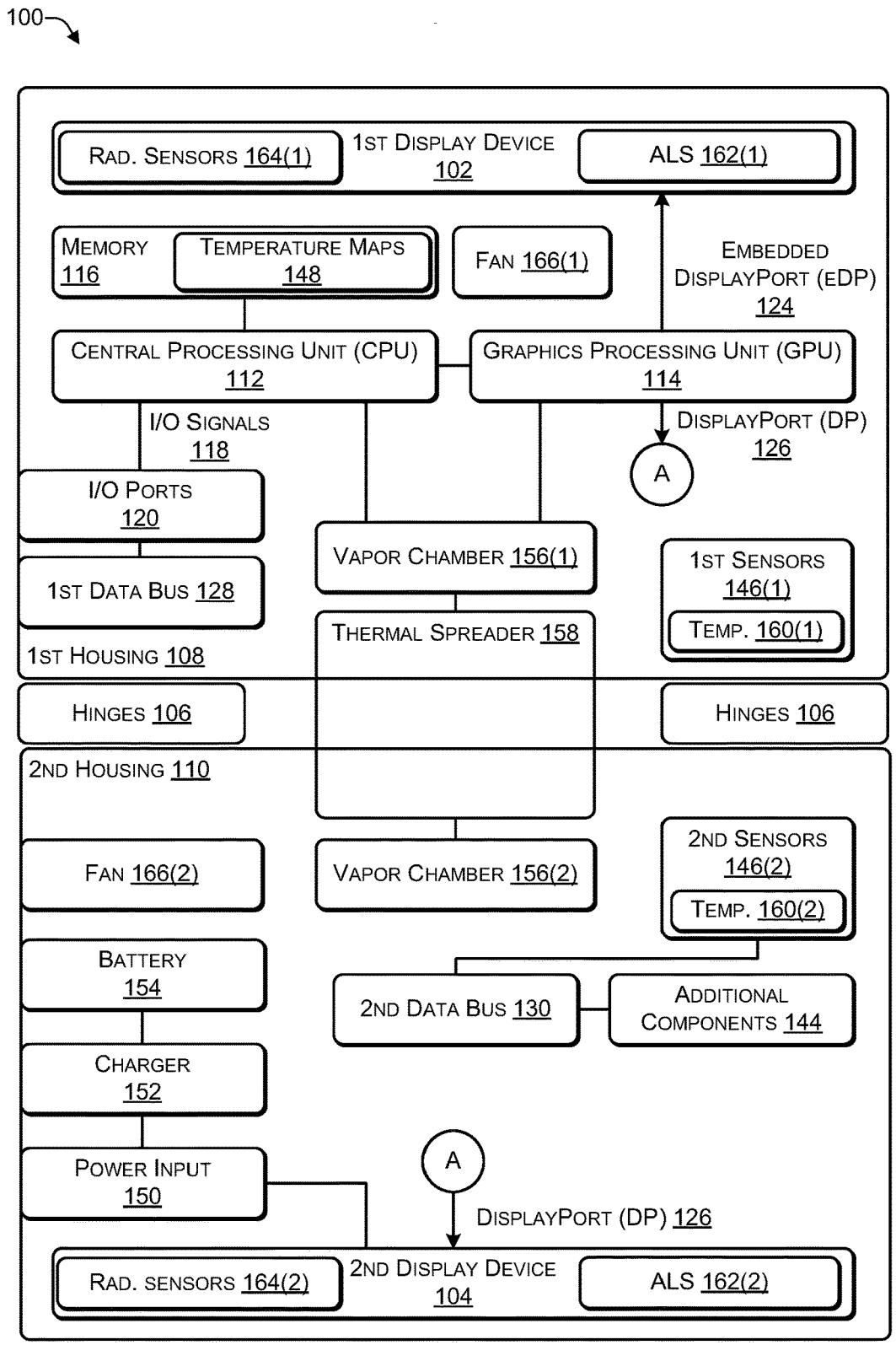
FIG. 1 is a block diagram of an architecture of a computing device according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

A portable computing device may have either two (or more) display devices or a foldable display device. The display device(s) may be folded when a small form factor is desired and may be opened up when a larger display surface is desired. For example, a first housing, that includes a first display device, may be coupled to a second housing, that includes a second display device such that the first display device can be positioned at an angle between about 0 degrees to about 360 degrees relative to the second display device. In some cases, the first housing may be coupled to the second using one or more hinges or another type of mechanical coupling. In other cases, a single flexible (e.g., bendable) display panel may be attached to both the first housing and the second housing, with a gap in between the two housings to enable the display panel to bend, thereby enabling the first display device to be positioned at an angle between about 0 degrees to about 360 degrees relative to the second display device. The heat generated by the components in each housing may cause the colors (including color intensity) to change. For example, the colors (and intensity) displayed by the display panel may change significantly if the temperature in a particular housing increases above a threshold amount. For example, each display panel may have an operating temperature range (e.g., specified by the manufacturer) such that if the display panel is subject to temperatures outside the operating range, the colors (and intensity) displayed by the panel may degrade.

The systems and techniques described herein may determine a temperature in one or more housings, determine if the temperature is affecting the colors (and intensity) being displayed by the display panel(s), and perform one or more remedial actions. For example, the remedial actions may include reducing an amount of power being supplied to one or more display panel(s), modifying the colors (and brightness/intensity of the colors) being displayed by one or more of the display panel(s) (e.g., to reduce power consumption and/or reduce heat generated), increasing a fan speed (or circulation speed when using liquid cooling) of one or more fans in one or both housings, reducing power consumption by the CPU and/or GPU (e.g., by reducing a clock speed, reducing a number of cores being used, increasing a fan speed of one or more fans, and the like) to reduce heat produced by the CPU and/or GPU, reduce the screen resolution, another type of action to reduce heat, or any combination thereof.

The systems and techniques described herein may be used with computing devices that use display panels. Display panels, such as, for example, OLED display panels, that use a metal or metallic layer may be more susceptible to degradation of colors and color intensity due to temperature, particularly in the case of a computing device that has two display panels or a single foldable display panel. For example, when the display panels are folded such that the angle between the display panels is less than or equal to a threshold amount (e.g., 90 degrees), the heat emanating from a first panel (or a first portion of the panel) may cause the second panel (or the second portion of the panel) to heat up and vice-versa. When the angle is relatively wide (e.g., 180 degrees), the heat emanating from each panel may dissipate into the atmosphere. However, as the angle changes, more and more heat from each panel may strike the other panel, causing the other panel to heat up.

Multiple temperature maps may be created for each display panel (e.g., LED, OLED, and the like) that identify the effect of the hinge angle on temperature and the effect of the temperature on color and color intensity. For example, during product development or product manufacturing, multiple temperature maps may be determined based on hinge angle, brightness setting, power consumption, CPU and/or GPU clock speed, number of CPU and/or GPU cores, screen resolution, fan speed (of fans located in the housings), software applications being executed, and the like. The temperature maps may be determined for the most common usages envisioned by the developers. For example, a temperature map may be created between a first hinge angle (e.g., 180 degrees) and a second hinge angle (e.g., 60 degrees) at every N degrees (e.g., N=2, N=5, N=10). To illustrate, if N=10, a heat map determined at 180, 170, 160, 150, 140, 130, 120, 110, 100, 90, 80, 70, and 60 degrees. The process of determining a temperature map at different hinge angles may be repeated for a predefined number of brightness levels (e.g., 70%, 80%, 90%, 100%), a predefined set of clock speeds (e.g., 80%, 90%, and 100% of a highest CPU/GPU clock speed), a predefined set of fan speeds (e.g., low, medium, might), a predefined number of CPU and/or GPU cores (e.g., 25%, 50%, or 100% of the number of cores), a predefined set of display resolutions (e.g., 3840× 2160p, 1920×1080p, etc.), another predefined set of a particular setting affecting heat, or any combination thereof. In some cases, multiple thermal micro-electro-mechanical systems (MEMS) may be distributed in each housing to create a thermal map. An OLED has characteristics similar to a diode, such that temperature may be correlated to current draw by the device.

When a user is operating the computing device, the computing device may periodically (e.g., every N milliseconds, where N>0) determine a temperature in each housing. Based on the temperature in each housing, the computing device may determine if the temperature is predicted (e.g., based on testing during or prior to manufacturing) to cause color (or color intensity) degradation. For example, if the temperature of a particular housing is within a predetermined temperature range, then the display panel in the particular housing may display colors within a particular tolerance that is considered normal (e.g., non-degraded). When the temperature of a particular housing is outside the predetermined temperature range, then the display panel in the particular housing may display colors with a perceivable amount of color and/or color intensity degradation. If the temperature of a particular housing is outside the predetermined temperature range, then the computing device may perform one or more remedial actions (as described above) to reduce the temperature and thereby reduce the degradation. In this way, if the user is using the computing device in a particular manner that causes the temperature in one or both housings to exceed a threshold, resulting in a perceivable color and/or color intensity degradation, the computing device may perform one or more remedial actions (as described above) to reduce the temperature and thereby reduce the degradation. For example, for a computing device that uses two (or more) display panels with a metal or metallic layer, such as OLED display panels, when user placed the computing device in an orientation in which the display panels are less than 180 degrees apart, the heat radiated from each display panel may be partially absorbed by the other display panel, causing the temperature of each display panel to increase. Based on the temperature of each housing, the pre-determined temperature maps may be used to determine whether at least a portion of a display panel is outside the predetermined temperature range. If at least a portion of the display panel is outside the predetermined temperature range, then the colors and/or color intensity being displayed by the display panel may be perceived as degraded (e.g., the difference in colors and/or color intensity between the two display panels). In response, the computing device may perform one or more remedial actions to reduce the temperature and reduce the perceived color degradation. In this way, the user's experience can be improved by automatically (e.g., without human interaction) detecting when the temperature in each housing has increased to a level that may cause color (or color intensity) degradation and performing one or more compensatory actions to avoid the user perceiving the color (or color intensity) degradation.

For example, a computing device may include (1) a first housing with a first display device (or a first portion of an OLED display device), a first set of temperature sensors, a cooling mechanism (e.g., air cooling openings, fans, liquid cooling or the like), and a first set of ambient light sensors and (2) a second housing comprising a second display device (or a second portion of the OLED display device), a second set of temperature sensors, a cooling mechanism (e.g., air cooling openings, fans, liquid cooling or the like), and a second set of ambient light sensors. The first display device and the second display device may use a display technology, such as, for example LED, OLED, or the like. In some cases, a mechanical coupling mechanism, such as, for example, one or more hinges, may be used to couple the first housing to the second housing to enable the first display device to be placed at an angle between about 0 degrees to about 360 degrees relative to the second display device. In other cases, e.g., if an OLED display device is used, the OLED display device may be bendable to enable the first display device to be placed at an angle between about 0 degrees to about 360 degrees relative to the second display device. In some cases, a vapor chamber may be coupled to the one or more processors and a thermal spreader may be coupled to the vapor chamber. For example, the vapor chamber may include a graphene layer. The first housing may include a first portion of the vapor chamber and the second housing may include a second portion of the vapor chamber.

The computing device may include one or more processors (e.g., at least one CPU and zero or more GPUs) and one or more non-transitory computer readable media storing instructions executable by the one or more processors to perform various operations. For example, the operations may include determining (e.g., using a hinge sensor or other mechanism) the angle between the first display device and the second display device. The operations may include determining a first temperature map of the first housing based at least in part on the angle and first temperature data received from the first set of temperature sensors and determining a second temperature map of the second housing based at least in part on the angle and second temperature data received from the second set of temperature sensors. Based at least in part on the first temperature map and the second temperature map, the operations may include determining one or more differences (e.g., temperature, color, color intensity, and the like) between the first display device and the second display device. For example, each temperature map may include multiple temperature zones, with each zone having a different temperature than other zones. Temperature zones greater than a predetermined threshold may cause temperature induced variations (e.g., due to degradation) in color and/or color intensity, resulting in perceivable color and/or color intensity differences between the display devices.

The operations may include determining one or more remedial actions based at least in part on the differences (e.g., temperature, color, color intensity, and the like) between the first display device and the second display device and performing the one or more remedial actions. The remedial actions may include at least one of (1) increasing a fan speed of at least one fan located in either the first housing or the second housing (or increasing a circulation rate at which a liquid is circulated in a liquid cooling system), (2) reducing a brightness level of at least one of the first display device or the second display device, (3) reducing a screen resolution of at least one of the first display device or the second display device, (4) reducing a clock speed of the one or more processors, (5) reducing a number of cores being used by the one or more processors, (6) another action to reduce power consumption and/or heat generation by components of the computing device, or any combination thereof. Performing the one or more remedial actions may (1) reduce a temperature of the first housing, the second housing, or both, (2) reduce at least one of the one or more color differences between the first display device and the second display device, (3) reduce the color difference or the color intensity difference between the first display device and the second display device, (4) reduce a temperature of the first display device, the second display device, or both, (5) reducing temperature induced color and/or color intensity degradation, (6) modifying, based on a calibration curve, one or more of a red level, a green level, or a blue level associated with at least one of the first display device or the second display device to reduce a power consumption of one or both of the display devices, or any combination thereof, and (7) increase performance, quality, and a life of each display device.

FIG. 1 is a block diagram of an architecture of a computing device according to some embodiments. In some implementations, the computing device 100 may include two (or more) housings while in other implementations the computing device 100 may include a single housing (e.g., a tablet form factor). As illustrated in FIG. 1, the computing device 100 may include a first housing 108 coupled to a second housing 110 via one or more hinges 106 (or other mechanical coupling mechanism). The hinges 106 may enable the two housings 108, 110 to be positioned at different angles relative to each other in different orientations (e.g., various vertical orientations and various horizontal orientations). Of course, additional housings may be attached via additional hinges (or other mechanical coupling mechanism) to create a computing device with multiple housings.

A first display device 102 may be located in the first housing 108 and a second display device 104 may be located in the second housing 110. Each of the display devices 102, 104 may include a display panel (e.g., LED panel, OLED panel, or the like) along with an electronic circuit to control the display panel. For example, each electronic circuit may provide software control to adjust colors, intensity, brightness, contrast, and other parameters associated with each display panel. In some cases, the first display device 102 may include a first display panel and the second display device 104 may include a second display panel. In such cases, the first and second display panel may use LED, OLED, or other technology. In other cases, the first display device 102 may be a first portion of an OLED panel and the second display device 104 may be a second portion of the same OLED panel. In such cases, the OLED may be flexible and bendable, thereby enabling the first display device 102 to be placed at an angle (between about 0 to about 360 degrees) relative to the second display device 104 by bending a third portion of the OLED panel that is in-between the first display device 102 and the second display device 104.

A first portion of the components of the computing device 100 may be located in the first housing 108 (e.g., behind the first display device 102) while a remaining portion of the components of the computing device 100 may be located in the second housing 110 (e.g., behind the second display device 104). For example, as illustrated in FIG. 1, the components located in the first housing 108 may include at least one central processing unit (CPU) 112, a graphics process unit (GPU) 114, and a memory (e.g., computer-readable media) 116. The memory 116 may be used store applications and data, including a set of temperature maps 148. In each of the temperature maps 148, the temperature may range from about 30° Celsius (C) to about 55° C.

The GPU 114 may be integrated into the CPU 112 or may be a separate device from the GPU 114. The CPU 112 may communicate input/output (I/O) signals 118 via multiple I/O post 120. The I/O ports 120 may include video ports (e.g., a video graphics adapter (VGA) port, a digital video interface (DVI) port, a high definition media interface (HDMI) port, a ThunderBolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 100 may include at least one digital signal processing (DSP) processor 122 to perform audio (and video) signal processing. The GPU 114 may provide two or more lanes of embedded DisplayPort (eDP) output 124 that are sent to the first display device 108 in the first housing 108 and two or more lanes of DisplayPort (DP) output 126 that are sent (e.g., wirelessly or via a cable) to the second display device 110 in the second housing 110.

A first data bus 128 in the first housing 108 and a second data bus 130 in the second housing 110 may distribute data among the various components of the computing device 100. For example, the data buses 128, 130 may distribute data from the I/O signals 118, the I/O ports 120, a first set of sensors 146(1), a second set of sensors 146(2), and additional components 144. For example, the data buses 128, 130 may distribute data by receiving data from a component of the computing device 100 and transmitting the data to one or more of the other components of the computing device 100.

The second housing 110 may include a remaining portion of the components of the computing device 100. In some cases, the components in the second housing 110 may be located behind the second display device 104. The second housing 110 may include the additional components 144 (e.g., keyboard, touchpad, trackball, speaker, microphone, Wi-Fi antenna, Bluetooth antenna, Zigbee Antenna, cellular antenna, and the like), the second set of sensors 146(2), a power input 150 (e.g., alternating current (AC) or direct current (DC) input), a charger 152, and a battery 154. The battery charger 152 may be used as a power source to provide power instead of (or in addition to) the battery 154 when the battery 154 is depleted or inoperable. In some cases, data cables may run through the hinges 106 to connect the components of the computing device 100 located in the first housing 108 with the components of the computing device 100 located in the second housing 110. In other cases, a first wireless transceiver in the first housing 108 and a second wireless transceiver in the second housing 110 may provide wireless communications between (1) the components of the computing device 100 located in the first housing 108 and (2) the components of the computing device 100 located in the second housing 110.

The first set of sensors 146(1) may include one or more of an accelerometer, a gyroscope, an electronic compass (e-compass), a barometer, a magnetometer, a proximity sensor, one or more ambient temperature sensors 160(1) (e.g., to measure an ambient temperature at one or more locations within the first housing 108), a camera (or another type of imaging sensor), a fingerprint sensor, a global positioning satellite (GPS) sensor, a color sensor to measure an intensity of light, chroma, and hue associated with the display device 102, a sensor to detect movement of the hinges 106, a sensor to determine an angle between the housings 108 and 110, a proximity sensor, another type of sensor, or any combination thereof. The second set of sensors 146(2) may include one or more of an accelerometer, a gyroscope, an electronic compass (e-compass), a barometer, a magnetometer, a proximity sensor, one or more ambient temperature sensors 160(2) (e.g., to measure an ambient temperature at one or more locations within the second housing 110), a camera (or another type of imaging sensor), a fingerprint sensor, a global positioning satellite (GPS) sensor, a color sensor to measure an intensity of light, chroma, and hue associated with the display device 104, a sensor to detect movement of the hinges 106, a sensor to determine an angle between the housings 108 and 110, a proximity sensor another type of sensor, or any combination thereof.

The first housing 108 may include at least one ambient light sensor (ALS) 162(1) that is capable of measuring an amount of ambient light being received by a surface of the first display device 102. The first housing 108 may include one or more radiated heat sensors 164(1) to measure an amount of heat (e.g., by measuring infrared (IR) spectrum) radiated to the external surface of the first display device 102 from another source, such as, for example, the second housing 110. The second housing 110 may include at least one ALS 162(2) that is capable of measuring an amount of ambient light being received by a surface of the second display device 104. The second housing 110 may include one or more radiated heat sensors 164(2) to measure an amount of heat (e.g., by measuring infrared (IR) spectrum) radiated to the external surface of the second display device 104 from another source, such as, for example, the first housing 108.

The components of the computing device 100 may be distributed within the two housings 108, 110. For example, computing-related components (e.g., components that are typically included in a motherboard), such as the CPU 112, the memory 116, and other components may be located in the first housing 108 and power-related components, such as the battery 154, etc. may be located in the second housing 110. To provide cooling, a first set of (e.g., one or more) fans 166(1) (or another cooling mechanism such as a liquid cooling mechanism that circulates a liquid to cool components) may be located in the first housing 108. A second set of (one or more) fans 166(2) (or another cooling mechanism such as a liquid cooling mechanism that circulates a liquid to cool components) may be located in the second housing 110. One or more of the computing components (e.g., CPU 112, GPU 114, battery 154, and the like) may be in contact with a vapor chamber 156(1) in the first housing 108 or a vapor chamber 156(2) in the second housing 110. The vapor chambers 156 may each be a hollow cylinder (or other sealed shape) that includes a small amount of a liquid in a vacuum. The vapor chambers 156 may be made from a metal (or a metal alloy) such as copper (or a copper alloy). When heat is present at one end of the vapor chambers 156, the heat may cause the liquid to vaporize. The vaporized liquid may condense back to a liquid at another (e.g., cooler) end of the vapor chambers 156. The vapor chambers 156 may be used to cool components of the computing device, such as the CPU 112, the GPU 114, the battery 154, the memory 116, and the like.

A thermal spreader 158 may be in contact with the vapor chamber 156(1) that is located in a first housing 108. The thermal spreader 158 may conduct heat from components (e.g., via the contact with the vapor chamber) in the first housing 108 to the second housing 110 where the heat may be more easily dissipated because the components housed in the second housing 110 may generate less heat than the components in the first housing 108. The thermal spreader 158 may include one or more layers of thermally conductive materials, such as graphite, copper, aluminum, another type of material, or any combination thereof. The thermal spreader 158 may use at least 3 portions, e.g., a first portion in the first housing 108, a second portion in the second housing 110, and a third portion that thermally connects the first portion to the second portion. The third portion of the thermal spreader 158 may be sufficiently flexible to enable the first housing 108 to be placed at an angle (e.g., between about 0 to about 360 degrees) relative to the second housing 110. The third portion of the thermal spreader 158 may be capable of thermally conducting heat from a warmer housing to a cooler housing. In addition, the third portion of the thermal spreader may be designed to be repeatedly flexed (e.g., articulated) without breaking (or incurring other damage) for an expected life of the computing device 100. In some cases, the third portion of the thermal spreader 158 may be placed inside the hinges 106 that are used to couple the first housing 108 to the second housing 110. For example, the thermal spreader 158 may include a flexible material, such as graphene. To illustrate, a single graphene sheet may be used for both housings 108, 110 by threading the graphene sheet through the hinges 106 that have been hollowed out. In some cases, a portion of the graphene sheet may protrude outside the first housing 108 and the second housing 110. In such cases, the exposed graphene sheet may be protected using a cover made out of leather, plastic, cloth, or other flexible material with insulating properties.

In FIG. 1, the first set of components of the computing device 100 shown as being located in the first housing 108 and the remaining set of components shown as located in the second housing 110 are purely for illustration purposes. Depending on the implementation, different components of the computing device 100 may be housed in one or both of the housings 108, 110. For example, when the computing device 100 is designed for graphics processing, the GPU 114 and supporting hardware (e.g., graphics support chips, graphics memory, and the like) may be housed in the second housing 110. As another example, in some cases, the ports 120 may be located in the first housing 108, in the second housing 110, or split between the two housings 108, 110. As a further example, the battery 154 may include multiple power cells, with a portion of the power cells located in the first housing 108 and zero or more of the power cells located in the second housing 110. In some cases, which components of the computing device 100 are located in each of the housings 108, 110 may be determined by the thermal characteristics of the components. For example, the components may be distributed between the housings 108, 110 to enable each of the housings 108, 110 to heat to approximately the same ambient temperature. Doing so may avoid grouping components that generate the most heat into the same housing, thereby causing one housing to be hotter than the other housing. The temperature sensors 160 may be used to determine a current ambient temperature (e.g., in Celsius or Fahrenheit) within each of the housings 108, 110, a current ambient temperature close to each of the display devices 102, 104, or both. The colors displayed by the display devices 102, 104 may change based on temperature and one or more remedial actions may be taken to reduce temperature-induced color differences between the display devices 102, 104.

The display devices 102, 104 may be configured to behave as independent display devices or the display device 104 may be configured as an extension of the display device 102 to enable both display devices to function as a single larger sized display device. The operating system of the computing device 100 may enable the user to "lock" a particular orientation (e.g., rotation) of the content being displayed on each display device to avoid the computing device 100 repeatedly re-orientating (e.g., rotating) the content as the user moves (e.g., re-positions) the computing device 100.

Software instructions implementing an operating system and one or more applications, including at least one application to reduce (or eliminate) perceived color differences between the display devices 102, 104, may be stored in the memory 116. The software instructions may be executed by the CPU 112, by the DSP processor 122, or any combination thereof.

In some cases, the remedial actions may include setting a maximum power provided to the CPU) by adjusting operating system parameters. Power consumption settings may be modified using an interface such as, for example, an Advanced Configuration and Power Interface (ACPI), or similar interface. By setting the CPU maximum power, the amount of heat generated by the CPU may be kept within a predetermined threshold amount of heat. For example, a basic input/output system (BIOS) of the computing device 100 may include a CPU maximum power setting, frequency scaling, and the like. Components such as the CPU, GPU, and memory may each have a particular on clock multiplier. For example, clock multiplier x clock speed=speed at which component operates. Thus, if the system clock of the computing device 100 runs at 100 MHz, a clock multiplier of 3.0 may be used to enable the CPU to operate at 100 Mhz×3.0 multiplier=3.0 GHz. Frequency scaling may be performed by reducing the clock multiplier on the CPU to reduce the overall frequency (GHz) off of which the CPU, GPU, memory and other components may operate. Frequency scaling may be modified at the firmware level, while the operating system may automatically adjust the frequency scaling of the CPU based on the CPU workload. Thus, the remedial actions may include modifying the system clock speed and modifying individual component multipliers associated with the CPU, GPU, memory, and the like. For example, if the CPU is generating more than a predetermined amount of heat, the CPU multiplier may be reduced, if the GPU is generating more than a predetermined amount of heat, the GPU multiplier may be reduced, if the memory is generating more than a predetermined amount of heat, the memory multiplier may be reduced, and so on.

Thus, a computing device may include a first housing coupled to a second housing by one or more hinges (or other mechanical coupling mechanism). Various sensors, such as, for example, gyroscopes, electronic compasses (e.g., magnetometers), accelerometers, and the like, may be used to determine the screen orientation for the computing device. Ambient light sensors, color sensors, and temperature sensors may be used to determine an amount of ambient light, a perceived color, and an ambient temperature, respectively, of each of the display devices. Software stored in the memory 116 and executed by the CPU 112 may monitor, based on data provided by one or more temperature sensors, an ambient temperature in each of the housings. When an ambient temperature in one (or both) of the housings satisfies a predetermined temperature threshold (e.g., indicating that the display device may experience output degradation), the software may gather data, such as, for example, a hinge angle (e.g., an angle between the first housing and the second housing), a fan speed of one or more fans (e.g., in the first housing, the second housing, or both), display settings (e.g., brightness, contrast, intensity, and the like) of each display device, a power consumption of each display device, a power consumption of the computing device, a CPU clock speed, a GPU clock speed, a number of CPU cores being used, a number of GPU cores being used, other information related to heat generating components, or any combination thereof. The software may use the gathered data to select one of the temperature maps and use the temperature map to select a set of (one or more) remedial actions. For example, the selected temperature map may indicate that the battery is generating excessive (e.g., greater than a threshold amount of) heat. In response, the software may perform various remedial actions to reduce power consumption, thereby reducing the heat generated by the battery, resulting in reducing heat-induced degradation of the display device. For example, the remedial actions may include one or more of modifying the display settings (e.g., reducing brightness/intensity) of each display device, increasing a fan speed of one or more fans located in one or both housings (or a circulation speed of liquid in a liquid cooling system), reducing a CPU clock speed, reducing a GPU clock speed, reducing the number of CPU cores being used, reducing the number of GPU cores being used, and the like. As another example, the selected temperature map may indicate that the CPU is generating excessive (e.g., greater than a threshold amount of) heat. In response, the software may perform various remedial actions to reduce the heat generated by the CPU, thereby reducing heat-induced degradation of the display device. For example, the remedial actions may include reducing a CPU clock speed, reducing the number of CPU cores being used, or both. As yet another example, the selected temperature map may indicate that a particular display device is generating excessive (e.g., greater than a threshold amount of) heat. In response, the software may perform various remedial actions to reduce the energy consumption and/or reduce the amount of heat being generated by the particular display device, thereby reducing heat-induced degradation of the particular display device. For example, the remedial actions may include modifying the display settings of one or both display devices by reducing one or more of brightness, contrast, intensity, or another display setting. To illustrate, in the case of display devices that use a metallic layer (e.g., OLED), because at least a portion of the heat generated by one display device may be directed to and absorbed by the other display device, reducing the heat generated by one display device may reduce the amount of heat that the other display device receives. Reducing a temperature difference between the display devices may reduce perceived color differences between the display devices, increase performance of the display devices, increase a quality of colors and color intensity being displayed by the display devices, and increase a life of both display devices.

Figure 2:
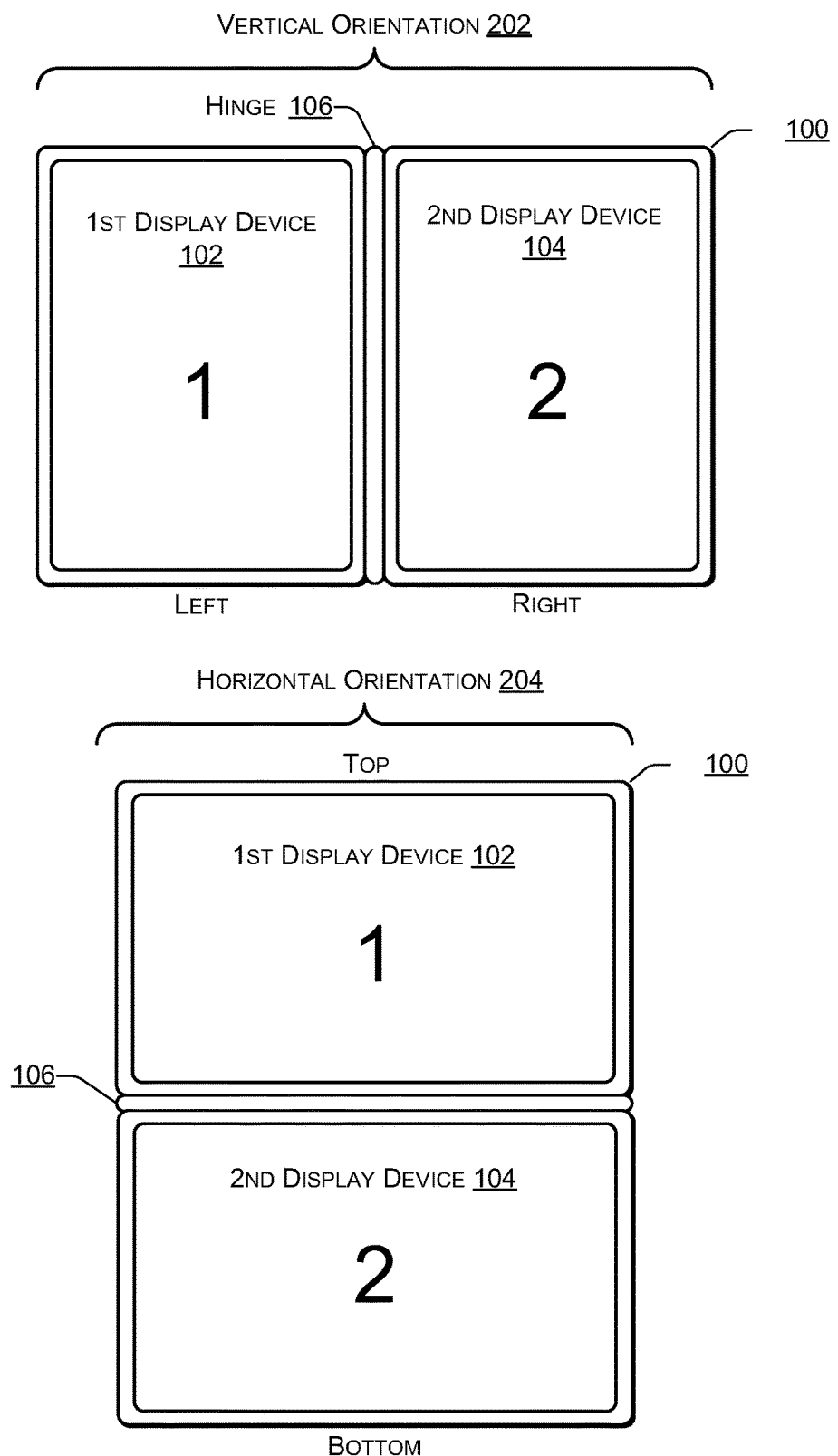
FIG. 2 is a block diagram illustrating different orientations of a dual-display device according to some embodiments.

FIG. 2 is a block diagram 200 illustrating different orientations of a dual-display device (e.g., the computing device 100 of FIG. 1) according to some embodiments. The computing device 100 may include at least two display devices 102, 104. The computing device 100 may be displayed in a vertical (e.g., portrait) orientation 202 or a horizontal (e.g., landscape) orientation 204. For example, in the vertical orientation 202, the first display device 102 may be on one side (e.g., the left side or the right side), the second display device 104 may be on another side (e.g., the right side or the left side), and the hinge 106 may join the first display device 102 to the second display device 104. Additional examples of the vertical orientation 202 are illustrated in FIG. 3. In the horizontal orientation 204, the first display device 102 may be located at the top (or the bottom) of the computing device 100 with the hinge 106 in the middle and the second display device 104 may be located at the bottom (or the top) of the computing device 100. Additional examples of the horizontal orientation 204 are illustrated in FIG. 4.

FIG. 3 is a block diagram 300 illustrating additional vertical orientations of a dual-display device according to some embodiments. Additional examples of the vertical orientation 202 may include a book orientation 302 and a vertical tablet orientation 304. For example, in a first book orientation 302(1), the first display device 102 may be on the left and the second display device 104 may be on the right. Alternately, in a second book orientation 302(2), the second display device 104 may be on the left and the first display device 102 may be on the right.

In the vertical tablet orientation 304, the first display device 102 may be on the left and the second display device 104 may be on the right. In a first vertical tablet orientation 304(1), the first display device 102 may be facing a user and the second display device 104 may be rotated approximately 360 degrees to face away from the user. In a second vertical tablet orientation 304(2), the second display device 104 may be facing the user while the first display device 102 may rotated approximately 360 degrees to face away from the user.

Figure 4:
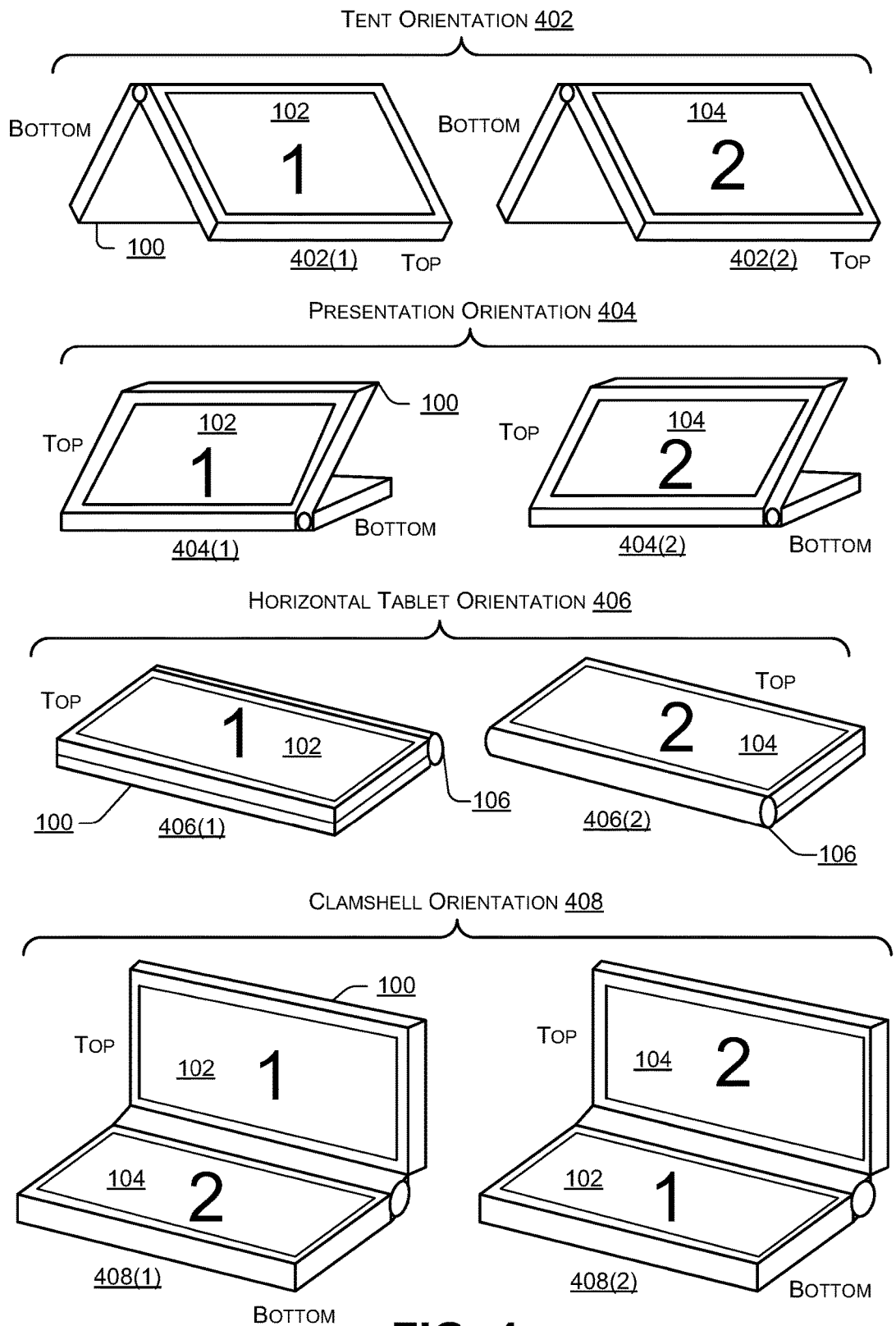
FIG. 4 is a block diagram illustrating modes of a dual-display device in a horizontal orientation according to some embodiments.

FIG. 4 is a block diagram 400 illustrating additional horizontal orientations of a dual-display device according to some embodiments. Additional examples of the horizontal orientation 204 may include a tent orientation 402, a presentation orientation 404, a horizontal tablet orientation 406, and a clamshell orientation 408.

In 402(1), the first display device 102 may be at the top facing the user while the second display device 104 may be at the bottom facing away from the user. In 402(2), the second display device 104 may be at the top facing the user and the first display device 102 may be at the bottom facing away from the user.

In 404(1), the first display device 102 may be at the top facing the user and the second display device 104 may be at the bottom facing down. In 404(2) the second display device 104 may be at the top facing the user and the first display device 102 may be at the bottom facing down.

In 406(1), the first display device 102 may be at the top facing the user and the second display device 104 may be at the bottom facing down (e.g., away from the user). In 406(2), the second display device 104 may be at the top facing the user and the first display device 102 may be at the bottom facing down (e.g., away from the user).

In 408(1), the first display device 102 may be at the top facing the user and the second display device 104 may be at the bottom facing the user (e.g., in a position where traditionally, a keyboard is located in a laptop). In 408(1), in some cases, a QWERTY-based keyboard may be displayed on the second display device 104 and used to receive keyboard input. In 408(2), the second display device 104 may be at the top facing the user and the first display device 102 may be at the bottom facing the user (e.g., in a position where traditionally, a keyboard is located in a laptop). In 408(2), in some cases, a QWERTY-based keyboard may be displayed on the first display device 102 and used to receive keyboard input.

Figure 5:
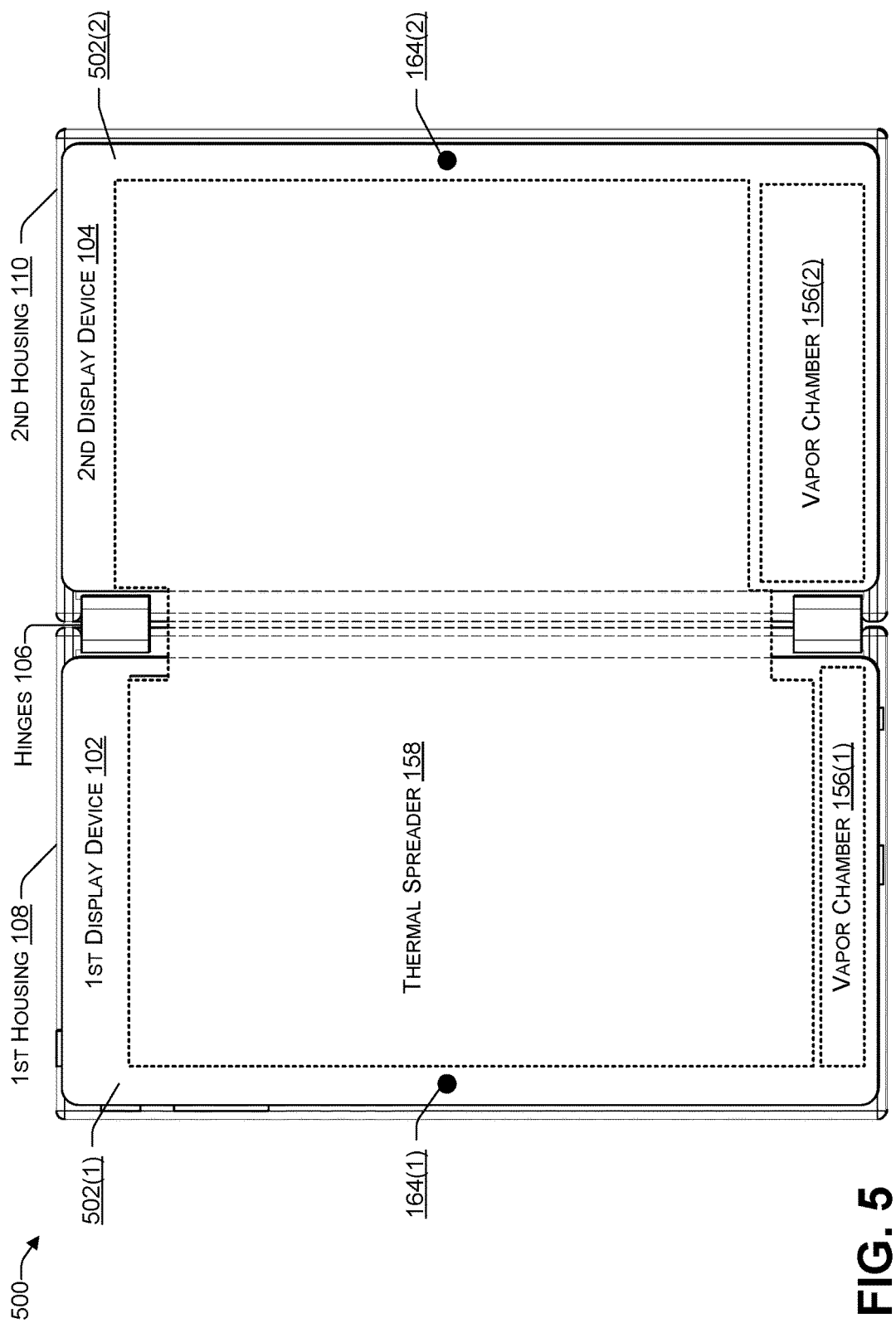
FIG. 5 is a block diagram illustrating a thermal spreader in a dual-display device according to some embodiments.

FIG. 5 is a block diagram 500 illustrating a thermal spreader of a dual-housing computing device according to some embodiments. The thermal spreader 158 may be in contact with one or more vapor chambers (or another type of heat sink), such as the vapor chamber 156(1) in the first housing 108, the vapor chamber 156(2) in the second housing 110, or both.

If the hinges 106 are fairly small (e.g., a sum of the length of all the hinges 106 is less than 50% of the length of the longest side of one of the housings 108, 110), then the thermal spreader 158 may be a single sheet spanning both housings 108, 110, as illustrated in FIG. 5. A small portion of the thermal spreader 158 that spans the two housings 108, 110 may be external to the computing device 100. In such cases, a spreader cover that is made from a flexible material, such as leather, plastic, cloth, or the like, that is capable of insulating heat may be used to protect the exposed portion of the thermal spreader.

If the hinges 106 are not small (e.g., a sum of the length of all the hinges 106 is greater than or equal to 50% of the length of the longest side of one of the housings 108, 110), then the thermal spreader 158 may be a single sheet spanning both housings 108, 110, and the portion of the thermal spreader 158 that spans the two housings 102, 104 may be threaded through openings (e.g., conduits) in the hinges 106. In such cases, a spreader cover may not be used.

If a single OLED panel is used, the hinges 106 may be a portion of the OLED panel between the first display device 102 and the second display device 104. The first display device 102 may be a first portion of the OLED panel, the second display device 104 may be a second portion of the OLED panel, and the hinges 106 may be a third portion (e.g., between the first portion and the second portion) of the OLED panel.

At least one radiated heat sensor 164(1) in the first housing 108 may measure an amount of heat (e.g., by measuring infrared (IR) spectrum) being radiated to (e.g., received by) the external surface of the first display device 102 from another source, such as, for example, the second housing 110. At least one radiated heat sensor 164(2) in the second housing 110 may measure an amount of heat (e.g., by measuring infrared (IR) spectrum) being radiated to (e.g., received by) the external surface of the second display device 104 from another source, such as, for example, the first housing 108. While FIG. 5 illustrates a single radiated heat sensor in each of the housings 108, 110, more than one radiated heat sensor may be used per housing. The radiated heat sensors may be embedded into a bezel 502(1), 502(2) of the display devices 102, 104, respectively. While FIG. 5 illustrates the radiated heat sensors 164 in an outer edge of the bezels 502, the radiated heat sensors 164 may be located in an inner edge of the bezels 502 (e.g., near the hinges 106), a top edge of the bezels 502, or a bottom edge of the bezels 502. If more than one radiated heat sensor is used per housing, the additional radiated heat sensors may be located at one or more of the outer edge of the bezels 502, the inner edge of the bezels 502, the top edge of the bezels 502, or the bottom edge of the bezels 502.

Figure 6:
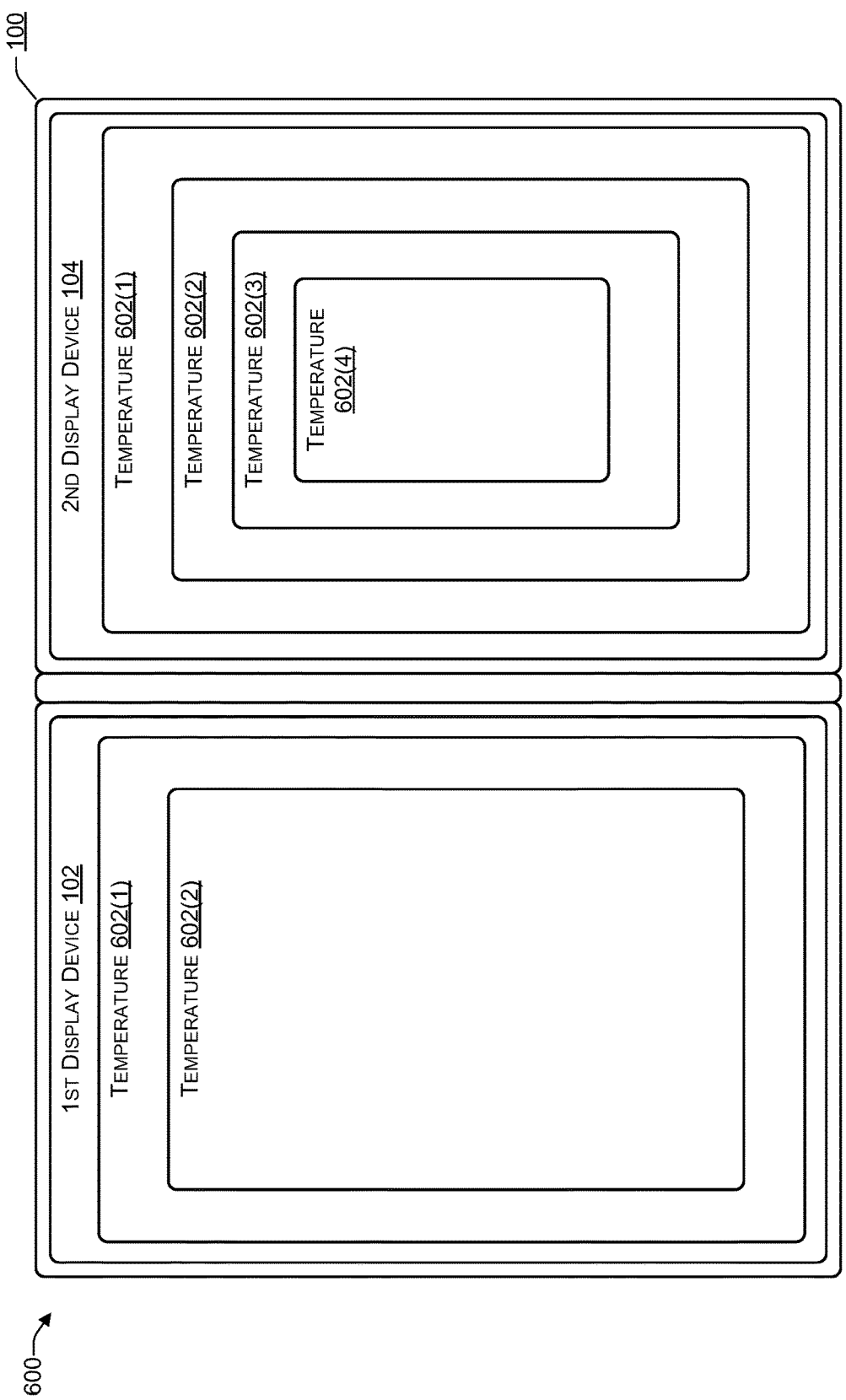
FIG. 6 is a block diagram illustrating temperature maps of a dual-display device in which the display devices are approximately 180 degrees apart according to some embodiments.

FIG. 6 is a block diagram 600 illustrating temperature maps of a dual-display device in which the display devices are approximately 180 degrees apart according to some embodiments. The temperature map of the display devices 102, 104 may include one or more temperature zones. A temperature zone is an area that is approximately the same temperature, e.g., the temperature in the area is within a predetermined range (e.g., plus or minus N ° C., where N>0, such as +/−1° C., +/−2° C., or the like).

As illustrated in FIG. 6, a temperature map of the second display device 104 may include temperature zones 602(1), 602(2), 602(3), and 602(4) and a temperature map of the first display device 102 may include temperature zones 602(1) and 602(2). Of course, depending on the components of the computing device 100 and the cooling mechanisms (e.g., fan, thermal spreader, vapor chamber, etc.) being used, each of the display devices 102, 104 may have more or fewer temperature zones. The temperatures may be such that 602(1)<602(2)<602(3)<602(4), e.g., 602(1) being the coolest and 602(4) being the warmest. The temperatures 602 may range from about 30° C. to about 55° C. For example, the temperature zone 602(1) may represent a first area with a temperature of about 32° C., the temperature zone 602(2) may represent a second area with a temperature of about 38° C., the temperature zone 602(3) may represent a third area with a temperature of about 45° C., and the temperature zone 602(4) may represent a fourth area with a temperature of about 48° C.

During product development, the computing device 100 may be tested to determine and store multiple temperature maps by varying (1) an angle between the display devices 102, 104, (2) a brightness setting of each of the display devices 102, 104, (3) colors being displayed by each of the display devices 102, 104, (4) a power consumption of the computing device 100, (5) a CPU clock speed, (6) a GPU clock speed, (7) a number of CPU cores being used, (8) a number of GPU cores being used, (9) a screen resolution, (10) particular software applications being executed, and the like. In terms of (10), some resource intensive software applications may cause increased power consumption and increased heat due to heavy use of heat generating computing resources such as the CPU, the GPU, the memory, the display devices 102, 104, and the like.

Figure 7:
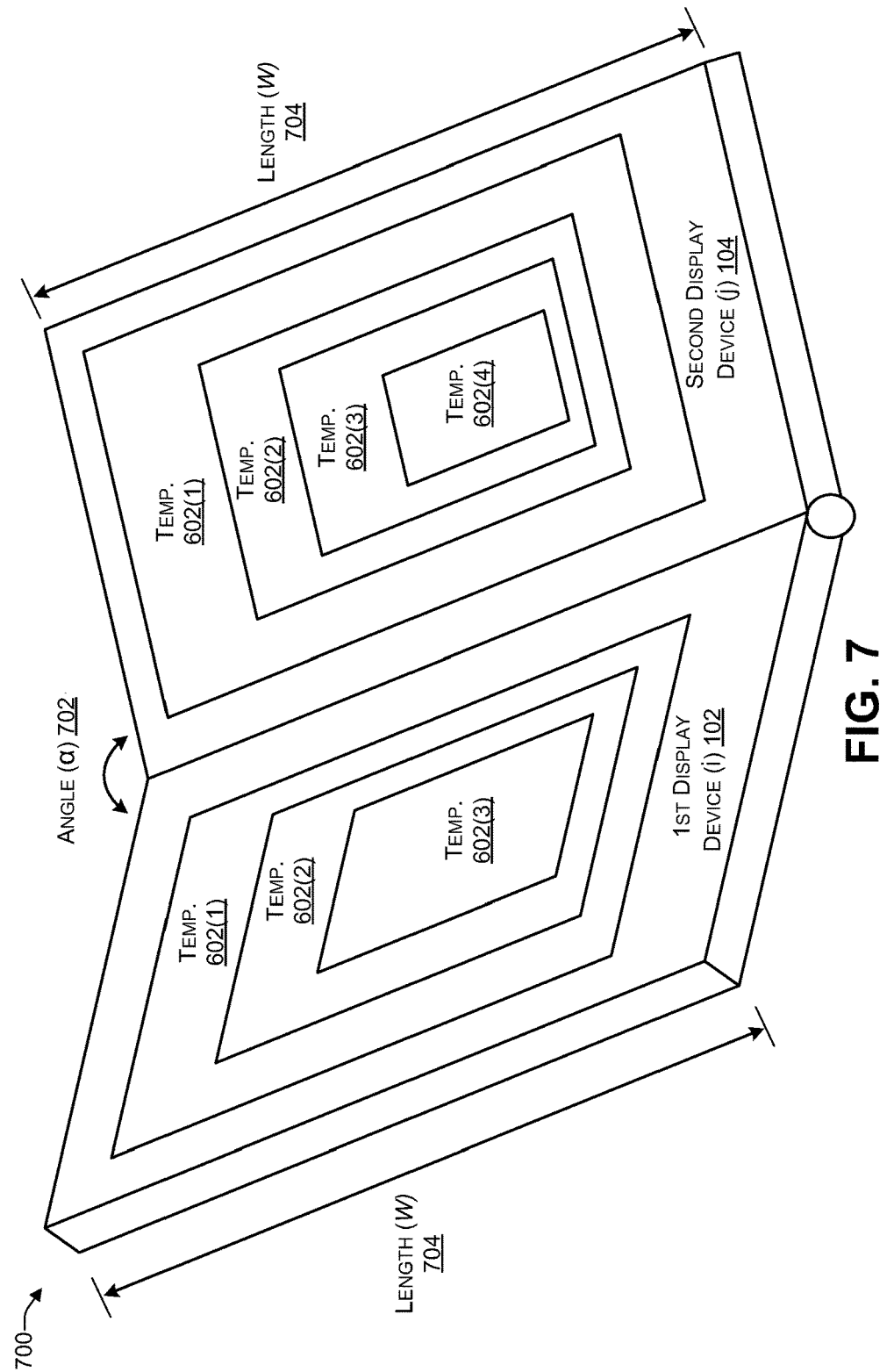
FIG. 7 is a block diagram temperature maps of a dual-display device in which the display devices are less than 180 degrees apart according to some embodiments.

FIG. 7 is a block diagram 700 temperature maps of a dual-display device in which the display devices are less than 180 degrees apart according to some embodiments. In FIG. 7, an angle (α) of the display device (i) 102 relative to the display device (j) 104 may be less than 180 degrees. Each of the display devices 102, 104 may have a length (w) 704. Note that in comparison to the temperature maps in FIG. 6, in FIG. 7, a portion of the heat radiating from the second display device 104 may be directed towards and absorbed by the first display device 102. The additional heat from the second display device 104 may cause the temperature map of the first display device 102 to include the temperature zone 602(3), which was absent in FIG. 6 (e.g., when the angle 702 was about 180 degrees).

The heat transfer rate may be determined as follows:

$Q_{1 \to 2}$=(radiation leaving surface 1 that strikes surface 2)−(radiation leaving surface 2 that strikes surface 1)

$$Q_{1 \to 2} = (A_1 E_{b1} F_{1 \to 2}) - (A_2 E_{b2} F_{2 \to 1})$$

where: A is the surface area for each respective surface, $E_b$ is the emissive power for each respective surface, $E_b = \sigma T^4$, where σ is the Stefan-Boltzmann constant $5.67 \times 10^{-8}$. The view factor $F_{i \to j}$, is a geometric quantity used in determining the heat transfer rate, and is a fraction of the radiation leaving surface i that directly strikes surface j. The view factor is a fraction between the range 0.00 and 1.00.

For inclined plates i, j of equal width and with a common edge:

$$F_{i \to j} = 1 - \sin(1/2\ \sigma) \text{ and}$$

$$\sum_{j=1}^{N} F_{i \to j} = 1.$$

Assume that surface i is surface 1 (display device 102), surface j is surface 2 (display device 104), and the open ambient area is surface 3, then $F_{1 \to 3} = 1 - F_{1 \to 2}$ from the above summation equation. The reciprocity relationship indicates that $A_1 F_{1 \to 3} = A_3 F_{3 \to 1}$. Given $A_1$ and $A_2$, $A_3$ can be solved for from the geometric equation. $F_{3 \to 1}$ can then be determined using the reciprocity relationship. The values can then be plugged into the heat transfer rate equation to solve for a heat transfer rate between each surface and the ambient air for various angles and temperatures. As the angle (e.g., hinge angle) between the two display devices decreases, less heat is transferred occurs from each of the display devices to the ambient air in front of the display devices while more heat transfer occurs between the two display devices. Table 1 (below) illustrates an example of heat transfer between the display devices 102, 104 for T1=50° C. and T2=50° C. (i) when the angle 702 is 180 degrees (left column) compared to (ii) when the angle 702 is 90 degrees (right column).

Table 2 (below) illustrates a second example of the heat transfer between the display devices 102, 104 for T1=40° C. and T2=50° C. (i) when the angle 702 is 180 degrees (left column) compared to (ii) when the angle 702 is 90 degrees (right column).

illustrates the heat transfer when the panels are at different temperatures (e.g., T1=40° and T2=50°). The values 3.96 W and 2.8 W in Table 1 and 2.06 W and 1.45 W in Table 2 are the heat transfer values between each of the display devices 102, 104 and ambient air. The examples in Table 1 and Table 2 illustrate that, as the angle between the display devices decreases (e.g., from about 180° to about 90°), the radiative heat transfer between each of the display devices 102, 104 and the ambient air decreases. In addition, the examples in Table 1 and Table 2 illustrate that the radiative heat transfer between the two display devices 102, 104 increases as the angle between the display devices decreases.

Figure 8:
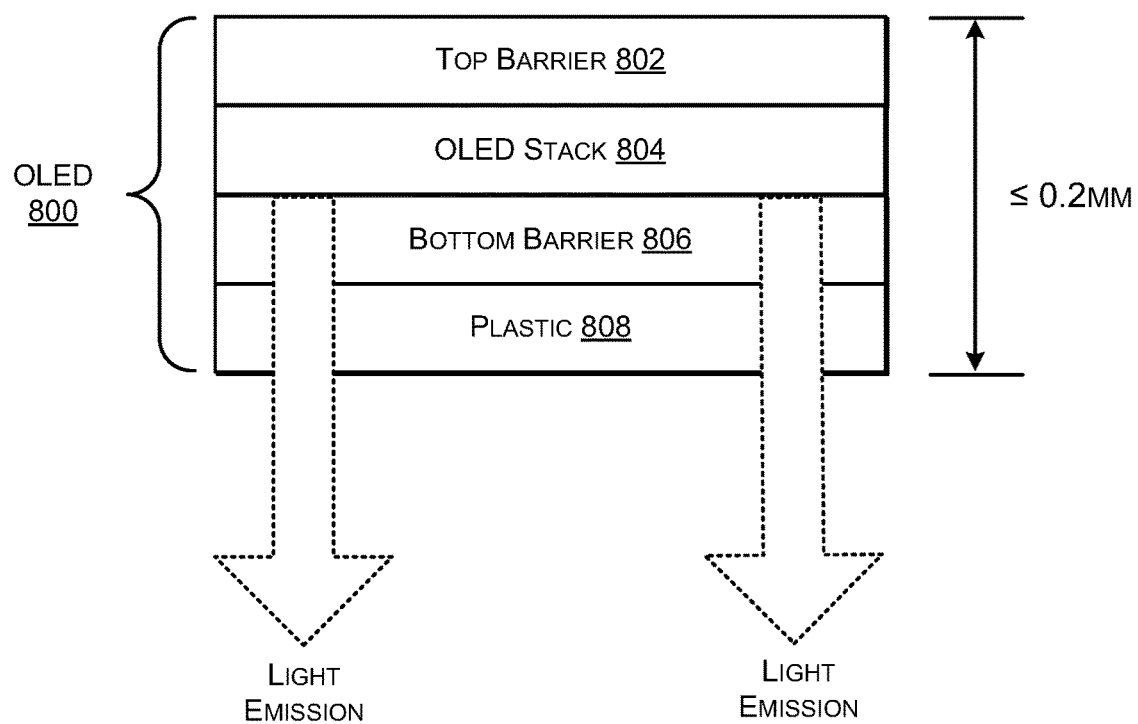
FIG. 8 is a block diagram illustrating layers of an OLED panel according to some embodiments.

FIG. 8 is a block diagram illustrating an OLED sheet 800 according to some embodiments. For example, the display devices 102, 104 may each include the OLED sheet 800 that includes several layers, including a top moisture barrier 802, an OLED stack 804, a bottom moisture barrier 806, and plastic (e.g., polyethylene naphthalate or similar) 808. The total width of the OLED sheet 204 may be 0.2 mm or less. The OLED stack 804 may be about 100-200 nanometers (nm) in width.

The moisture barriers 802, 806 may be made of plastic (e.g., polyethylene or the like), polymer-based barrier, atomic layer deposition (ALD), or another type of moisture barrier suitable for OLED. The light emitted by the OLED stack 804 may travel through the bottom moisture barrier 806 and the plastic 808. The plastic 808 may be transparent or translucent to enable the light from the OLED stack 804 to be transmitted through the plastic 808.

Figure 9:
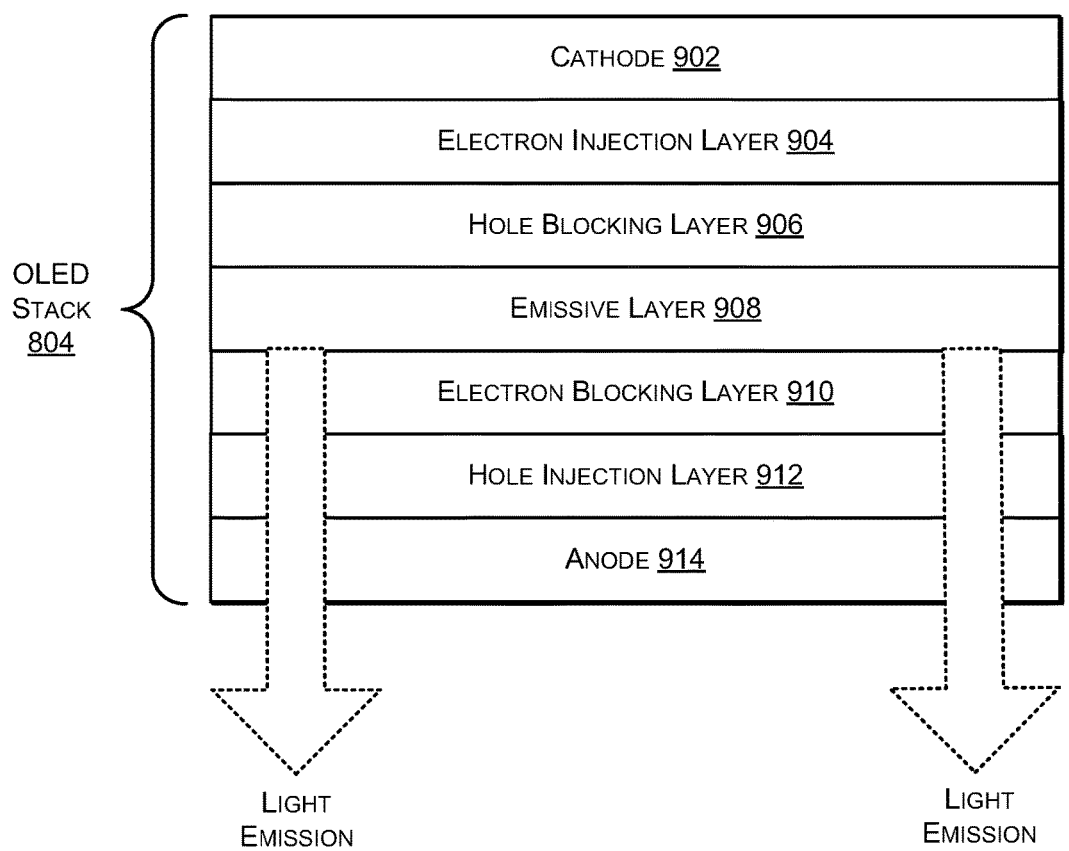
FIG. 9 is a block diagram illustrating layers of an OLED stack according to some embodiments.

FIG. 9 is a block diagram illustrating layers of an OLED stack according to some embodiments. The OLED stack 804 may be between about 100 to about 200 nanometers (nm) in width and may include a cathode (e.g., negative terminal) 902, an electron injection layer 904, a hole blocking layer 906, an emissive layer 908, an electron blocking layer 910, a hole injection layer 912, and an anode (e.g., positive terminal) 914. The cathode 902 may inject electrons into the emissive layer 908. The anode 914 may remove electrons.

TABLE 1

| Hinge Angle ($\alpha$) = 180° | Hinge Angle ($\alpha$) = 90° |
|---|---|
| T1 = 50° C. | T1 = 50° C. |
| T2 = 50° C. | T2 = 50° C. |
| T3 = 28° C. | T3 = 28° C. |
| A1 = A2 = 0.1218 m × 0.214 m = 0.026 m² | A1 = A2 = 0.1218 m × 0.214 m = 0.026 m² |
| A3 = 0.1218*2 m × 0.214 m = 0.05213 m² | A3 = 0.172251 m × 0.214 m = 0.037 m² |
| $F_{1 \to 2}$ = 1 − sin(0.5 × 180) = 0 | $F_{1 \to 2}$ = 1 − sin(0.5 × 90) = 0.293 |
| $F_{1 \to 3}$ = 1 − $F_{1 \to 2}$ = 1 − 0 = 1 | $F_{1 \to 3}$ = 1 − $F_{1 \to 2}$ = 1 − 0.293 = 0.707 |
| $A_1 F_{1 \to 3} = A_3 F_{3 \to 1} \to F_{3 \to 1} = A_1 F_{1 \to 3}/A_3 = 0.5$ | $A_1 F_{1 \to 3} = A_3 F_{3 \to 1} \to F_{3 \to 1} = A_1 F_{1 \to 3}/A_3 = 0.5$ |
| $Q_{1 \to 3} = \sigma A_1 T_1^4 F_{1 \to 3} - \sigma A_3 T_3^4 F_{3 \to 1} = 3.96$ W | $Q_{1 \to 3} = \sigma A_1 T_1^4 F_{1 \to 3} - \sigma A_3 T_3^4 F_{3 \to 1} = 2.80$ W |
| $Q_{2 \to 3}$ = 3.96 W | $Q_{2 \to 3}$ = 2.80 W |

TABLE 2

| Hinge Angle ($\alpha$) = 180° | Hinge Angle ($\alpha$) = 90° |
|---|---|
| T1 = 40° C. | T1 = 40° C. |
| T2 = 50° C. | T2 = 50° C. |
| T3 = 28° C. | T3 = 28° C. |
| A1 = A2 = 0.1218 m × 0.214 m = 0.026 m² | A1 = A2 = 0.1218 m × 0.214 m = 0.026 m² |
| A3 = 0.1218*2 m × 0.214 m = 0.05213 m² | A3 = 0.172251 m × 0.214 m = 0.037 m² |
| $F_{1 \to 2}$ = 1 − sin(0.5 × 180) = 0 | $F_{1 \to 2}$ = 1 − sin(0.5 × 90) = 0.293 |
| $F_{1 \to 3}$ = 1 − $F_{1 \to 2}$ = 1 − 0 = 1 | $F_{1 \to 3}$ = 1 − $F_{1 \to 2}$ = 1 − 0.293 = 0.707 |
| $A_1 F_{1 \to 3} = A_3 F_{3 \to 1} \to F_{3 \to 1} = A_1 F_{1 \to 3}/A_3 = 0.5$ | $A_1 F_{1 \to 3} = A_3 F_{3 \to 1} \to F_{3 \to 1} = A_1 F_{1 \to 3}/A_3 = 0.5$ |
| $Q_{1 \to 3} = \sigma A_1 T_1^4 F_{1 \to 3} - \sigma A_3 T_3^4 F_{3 \to 1} = 2.06$ W | $Q_{1 \to 3} = \sigma A_1 T_1^4 F_{1 \to 3} - \sigma A_3 T_3^4 F_{3 \to 1} = 1.45$ W |
| $Q_{2 \to 3}$ = 3.96 W | $Q_{2 \to 3}$ = 2.80 W |

Table 1 illustrates the heat transfer when the panels are at the same temperature (e.g., T1=T2=50°), while Table 2

The anode 914 may include a metal, such as, for example, indium tin oxide (ITO) or other suitable metal. The cathode 902 may include one or more metals, such as, for example, barium and calcium. In addition, because metals (e.g., barium and calcium) may react with oxygen, a capping layer, such as aluminum, may be used to avoid exposing the metals (e.g., barium and calcium) to oxidation. The metals in the cathode 902 and anode 914 may cause display devices that use OLED to conduct heat within each housing and radiate the heat into the ambient air (e.g., the air outside each display device).

Power (e.g., direct current) is provided to the OLED stack 804 via the anode 914 and the cathode 902. After power is applied, the cathode 902 receives electrons from the power source and the anode 914 removes the electrons. The added electrons cause the emissive layer 908 to be negatively charged (similar to an n-type layer in a junction diode), while the conductive layers (the layers 910, 912) become positively charged (similar to p-type material in a junction diode). Positive holes jump from the conductive layer (e.g., layers 904, 906) to the emissive layer 908. When a positive hole (a lack of an electron) meets an electron, the two cancel each other out, thereby releasing a brief burst of electromagnetic energy in the form of light (e.g., a photon). This process of a positive hole meeting an electron occurs many times a second, causing the OLED stack 804 to produce light when power is being applied to the cathode 902 and the anode 914.

Figure 10:
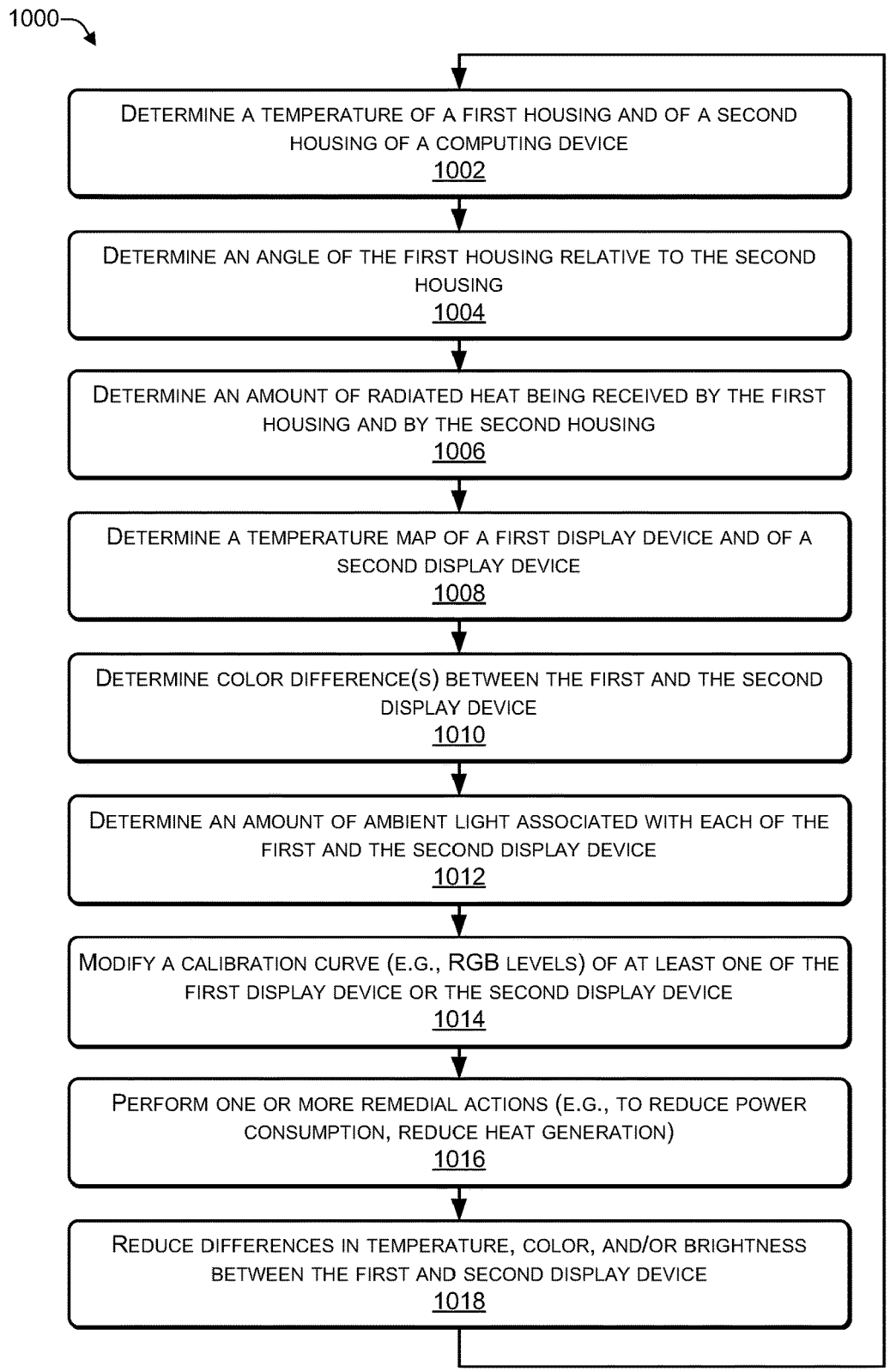
FIG. 10 is a flowchart of a process that includes determining an angle between a first display device and a second display device of a computing device according to some embodiments.

In the flow diagrams of FIG. 10 and FIG. 11, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 1000 and 1100 are described with reference to FIGS. 1, 2, 3, 4, 5, 6, 7, 8, and 9 as described above, although other models, frameworks, systems and environments may be used to implement this process.

FIG. 10 is a flowchart of a process 1000 that includes determining an angle between a first display device and a second display device of a computing device according to some embodiments. The process 1000 may be performed by one or more components of the computing device 100 of FIG. 1.

At 1002, the process may determine a first temperature in a first housing and a second temperature in a second housing (e.g., two housings of a portable computing device). At 1004, the process may determine an angle of the first housing relative to the second housing. At 1006, an amount of radiated heat being received by the first housing and by the second housing may be determined. At 1008, the process may determine a first temperature map of a first display device (in the first housing) and a second temperature map of a second display device (in the second housing). For example, in FIG. 1, the software instructions stored in the memory 116 and executed by the CPU 112 may perform the process 1000. The process 1000 may receive sensor data from the sensors 152, 164, and 146, including the temperature sensors 160. The process 1000 may determine the angle 702 (of FIG. 7) between the first display device 102 and the second display device 104 based on the sensor data. The process 1000 may determine a first temperature of the first housing 108 and a second temperature of the second housing 110. The process 1000 may receive data from the radiated heat sensors 164. Based on the temperature of each housing 108, 110 and the amount of radiated heat being received, the process 1000 may determine how much heat is being generated by the components in each housing 108, 110 (e.g., by subtracting the amount of temperature increase being caused by the radiated heated). Based on the angle, the amount of radiated heat being received, and the temperature of the first housing 108, the process 1000 may select a first temperature map of the temperature maps 148 associated with the first housing 108. Based on the angle, the radiated heat being received, and the temperature of the second housing 110, the process 1000 may select a second temperature map of the temperature maps 148 associated with the second housing 110.

At 1010, the process may determine (e.g., based on the first and second temperature maps), color and/or color intensity differences between the first display device and the second display device. At 1012, the process may determine (e.g., based on ambient light data received from ambient light sensors in the first and second housing) an amount of ambient light being received by the first display device and an amount of ambient light being received by the second display device. For example, in FIG. 1, the selected temperature maps from the maps 148 may be used to determine whether the temperatures may be causing color or color intensity degradation, causing perceivable color differences between the display devices 102, 104. The process 1000 may use ambient light data received from the ambient light sensors (ALS) 162 to determine an amount of ambient light falling on the first display device 102 and on the second display device 104. The amount of ambient light may contribute to perceived color and/or color intensity differences between the display devices 102, 104. For example, when a large amount of ambient light falls on a display device, the light may cause the colors being displayed to be perceived as washed out, e.g., by reducing a perceived intensity and/or brightness of the colors. When relatively little ambient light falls on a display device, the colors being displayed may be perceived as more vibrant, e.g., because the intensity and/or brightness of the colors may not be washed out by the ambient light.

At 1014, the process may modify a calibration curve (e.g., RGB levels) of the first display device, the second display device, or both. At 1016, the process may perform one or more remedial actions (e.g., to reduce power consumption, to reduce heat generation, or the like). At 1018, differences in temperature, color, and/or brightness between the first display device and the second display device may be reduced. Reducing a temperature difference between the display devices may reduce perceived color differences between the display devices, increase performance of the display devices, increase a quality of colors and color intensity being displayed by the display devices, and increase a life of both display devices. For example, in FIG. 1, the process 1000 may modify one or more of a red level, a green level, or a blue level associated with the first display device 102, the second display device 104, or both. For example, reducing a red phosphorescence level of one of the display devices 102, 104 may reduce power consumption by up to 25%, reducing a green phosphorescence level of one of the display devices 102, 104 may reduce power consumption by up to 20%, and reducing a blue phosphorescence level of one of the display devices 102, 104 may reduce power consumption by up to 29%. Reducing power consumption of the display devices 102, 104 may reduce heat being generated by the display devices 102, 104, thereby reducing a temperature of one or both of the display devices 102, 104. For example, when the display devices 102, 104 are at an angle that causes heat generated by one display device to be radiated to and absorbed by the other display device, reducing the heat generated by one display device may result in reducing the temperature of both display devices. The remedial actions may include reducing an amount of power being supplied to one or more of the display devices 102, 104, modifying the colors (and brightness/intensity of the colors) being displayed by one or more of the display devices 102, 104 (e.g., to reduce power consumption and/or reduce heat generated), increasing a fan speed of one or more fans in one or both of the housings 108, 110 (or increasing a circulation speed of liquid in a liquid cooling mechanism), reducing power consumption by the CPU 112 and/or GPU 114 (e.g., by reducing a clock speed, reducing a number of cores being used, and the like) to reduce heat produced by the CPU and/or GPU, reduce the screen resolution (e.g., from 1080p to 720p), another type of action to reduce heat, or any combination thereof.

Thus, a computing device may include two display devices (or two portions of a single display device) that can be placed at an angle of between 0 and 360 degrees. As the angle decreases to less than 180 degrees, the heat radiated by each display device may be partially absorbed by the other display device. Thus, depending on the angle between the display devices (or between the two portions of the single display device) and the temperature of each housing, each display device may have a particular temperature map, with multiple temperature zones, as illustrated in FIG. 7. If a display device has a temperature zone in the temperature map that is outside the normal operating temperature range of the display device, the temperature zone may cause a perceivable degradation of the colors and/or color intensity being displayed. To compensate for and reduce (e.g., to an imperceptible level) the degradation, one or more remedial actions may be performed. The remedial actions may include modifying RGB levels of the display devices 102, 104 to reduce power consumption (e.g., thereby reducing heat being generated) based on a calibration curve, increasing a fan speed (or circulation speed of liquid) of one or more fans in one or both of the housings 108, 110, reducing power consumption by the CPU 112 and/or GPU 114 to reduce heat produced by the CPU and/or GPU, reduce the screen resolution, another type of action to reduce heat, or any combination thereof. By reducing power consumption of one or more components of the computing device, the amount of heat being generated by the one or more components may be reduced, thereby reducing the temperature in the housings 108, 110, and lowering the temperatures of the display devices 102, 104. Lowering the temperatures may result in less color and/or color intensity degradation and reduce any perceivable differences in color and/or color intensity between the display devices 102, 104, increase a display performance of the display devices 102, 104, increase a quality of colors and color intensity being displayed by the display devices 102, 104, and increase a life of both display devices 102, 104. With a dual display device (or a device with a foldable display), content that is being displayed may span both display devices. If the user perceives differences in color and/or color intensity between the two display devices (or the two portions of the single display device), then the user's experience may be negatively impacted. For example, watching a movie or viewing other content may not be pleasant if the content is displayed across both display devices (or both portions of the same display device) and the content being displayed on one display device has a significant (e.g., perceivable) color and/or color intensity difference compared to the content being displayed on the other display device. By reducing color and/or color intensity differences such that the differences are imperceptible to the user, the user's experience is improved. The user may view content that spans both display devices without noticing any color and/or color intensity differences between the two display devices.

FIG. 11 is a flowchart of a process 1100 that includes performing remedial actions to reduce differences in color and/or color intensity between two display devices according to some embodiments. The process 1100 may be performed by one or more components of the computing device 100 of FIG. 1.

At 1102, the process may determine an angle of the first housing relative to the second housing. At 1104, an amount of radiated heat being received by the first display and by the second display may be determined. At 1106, the process may determine a first temperature in a first housing and a second temperature in a second housing (e.g., two housings of a portable computing device). At 1108, the process may determine a first temperature map of a first display device (in the first housing) and a second temperature map of a second display device (in the second housing). For example, in FIG. 1, the software instructions stored in the memory 116 and executed by the CPU 112 may perform the process 1000. The process 1000 may receive sensor data from the sensors 152, 164, and 146, including the temperature sensors 160. The process 1000 may determine the angle 702 (of FIG. 7) between the first display device 102 and the second display device 104 based on the sensor data. The process 1000 may determine a first temperature of the first housing 108 and a second temperature of the second housing 110. The process 1000 may receive data from the radiated heat sensors 164 and determine an amount of radiated heat being received by the each of the display devices 102, 104. Based on the angle, the amount of radiated heat being received, and the first temperature, the process 1000 may select a first temperature map of the temperature maps 148 associated with the first housing 108. Based on the angle, the amount of radiated heat being received, and the second temperature, the process 1000 may select a second temperature map of the temperature maps 148 associated with the second housing 110.

At 1110, the process may determine (e.g., based on ambient light data received from ambient light sensors in the first housing) an amount of ambient light being received by the first display device. At 1112, the process may determine (e.g., based on ambient light data received from ambient light sensors in the second housing) an amount of ambient light being received by the second display device. At 1114, the process may determine (e.g., based on the first and second temperature maps), temperature, color, and/or color intensity differences between the first display device and the second display device. For example, in FIG. 1, the selected temperature maps from the maps 148 may be used to determine whether the temperatures may be causing color or color intensity degradation, causing perceivable color differences between the display devices 102, 104. The process 1000 may use ambient light data received from the ambient light sensors (ALS) 162 to determine an amount of ambient light falling on the first display device 102 and on the second display device 104. The amount of ambient light may contribute to perceived color and/or color intensity differences between the display devices 102, 104. For example, when a large amount of ambient light falls on a display device, the light may cause the colors being displayed to be perceived as washed out, e.g., by reducing a perceived intensity and/or brightness of the colors. When relatively little ambient light falls on a display device, the colors being displayed may be perceived as more vibrant, e.g., because the intensity and/or brightness of the colors may not be washed out by the ambient light. Reducing a temperature difference between the display devices may reduce perceived color differences between the display devices, increase performance of the display devices, increase a quality of colors and color intensity being displayed by the display devices, and increase a life of both display devices.

At 1116, the process may determine one or more remedial actions (e.g., to reduce power consumption, to reduce heat generation, or the like). At 1118, the process may perform the one or more remedial actions to reduce differences in temperature, color, and/or brightness between the first display device and the second display device. For example, in FIG. 1, the process 1000 may modify one or more of a red level, a green level, or a blue level associated with the first display device 102, the second display device 104, or both. Reducing a red phosphorescence level of one of the display devices 102, 104 may reduce power consumption by up to 25%, reducing a green phosphorescence level of one of the display devices 102, 104 may reduce power consumption by up to 20%, and reducing a blue phosphorescence level of one of the display devices 102, 104 may reduce power consumption by up to 29%. Reducing power consumption of the display devices 102, 104 may reduce heat being generated by the display devices 102, 104, thereby reducing a temperature of one or both of the display devices 102, 104. For example, when the display devices 102, 104 are at an angle that causes heat generated by one display device to be radiated to and absorbed by the other display device, reducing the heat generated by one display device may result in reducing the temperature of both display devices. The remedial actions may include reducing an amount of power being supplied to one or more of the display devices 102, 104, modifying the colors (and brightness/intensity of the colors) being displayed by one or more of the display devices 102, 104 (e.g., to reduce power consumption and/or reduce heat generated), increasing a fan speed of one or more fans (or increasing a circulation speed of liquid) in one or both of the housings 108, 110, reducing power consumption by the CPU 112 and/or GPU 114 (e.g., by reducing a clock speed, reducing a number of cores being used, and the like) to reduce heat produced by the CPU and/or GPU, reduce the screen resolution (e.g., from 1080p to 720p), another type of action to reduce heat, or any combination thereof.

Thus, a computing device may include two display devices (or two portions of a single display device) that can be placed at an angle of between 0 and 360 degrees. As the angle decreases to less than 180 degrees, the heat radiated by each display device may be partially absorbed by the other display device. Thus, depending on the angle between the display devices (or between the two portions of the single display device) and the temperature of each housing, each display device may have a particular temperature map, with multiple temperature zones, as illustrated in FIG. 7. If a display device has a temperature zone in the temperature map that is outside the normal operating temperature range of the display device, the temperature zone may cause a perceivable degradation of the colors and/or color intensity being displayed. To compensate for and reduce (e.g., to an imperceptible level) the degradation, one or more remedial actions may be performed. The remedial actions may include modifying RGB levels of the display devices 102, 104 to reduce power consumption (e.g., thereby reducing heat being generated) based on a calibration curve, increasing a fan speed of one or more fans (or increasing a circulation speed) in one or both of the housings 108, 110, reducing power consumption by the CPU 112 and/or GPU 114 to reduce heat produced by the CPU and/or GPU, reduce the screen resolution, another type of action to reduce heat, or any combination thereof. By reducing power consumption of one or more components of the computing device, the amount of heat being generated by the one or more components may be reduced, thereby reducing the temperature in the housings 108, 110, and lowering the temperatures of the display devices 102, 104. Lowering the temperatures may result in less color and/or color intensity degradation and reduce any perceivable differences in color and/or color intensity between the display devices 102, 104. With a dual display device (or a device with a foldable display), content that is being displayed may span both display devices. If the user perceives differences in color and/or color intensity between the two display devices (or the two portions of the single display device), then the user's experience may be negatively impacted. For example, watching a movie or viewing other content may not be pleasant if the content is displayed across both display devices (or both portions of the same display device) and the content being displayed on one display device has a significant (e.g., perceivable) color and/or color intensity difference compared to the content being displayed on the other display device. By reducing color and/or color intensity differences such that the differences are imperceptible to the user, the user's experience is improved. The user may view content that spans both display devices without noticing any color and/or color intensity differences between the two display devices. Reducing a temperature difference between the display devices may reduce perceived color differences between the display devices, increase performance of the display devices, increase a quality of colors and color intensity being displayed by the display devices, and increase a life of both display devices.

Figure 12:
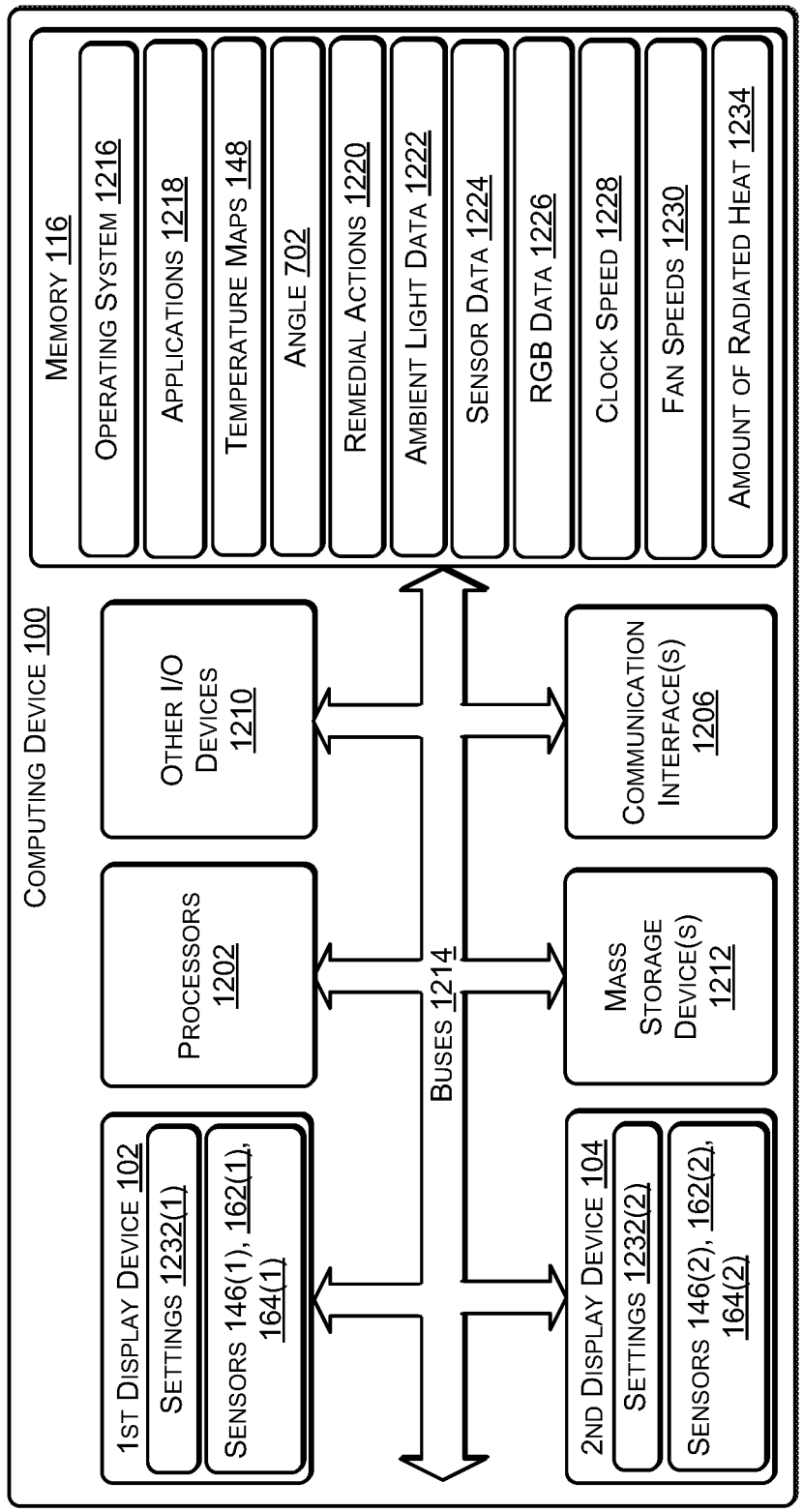
FIG. 12 illustrates an example configuration of a computing device that can be used to implement the systems and techniques described herein.

FIG. 12 illustrates an example configuration of the computing device 100 of FIG. 1 that can be used to implement the systems and techniques described herein. The computing device 100 may include one or more processors 1202 (e.g., the CPU 112 and the GPU 114 of FIG. 1), the memory 116, communication interfaces 1206 (e.g., including the I/O ports 120), the display devices 102, 104, other input/output (I/O) devices 1210 (e.g., keyboard, trackball, and the like, such as the additional components 144), and one or more mass storage devices 1212 (e.g., solid state disk drive), configured to communicate with each other, such as via one or more system buses 1214 (e.g., including the data bus 128, 130) or other suitable connections. While a single system bus is illustrated for ease of understanding, it should be understood that the system buses 1214 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 1202 are one or more hardware devices that may include a single processing unit or a number of processing units, all of which may include single or multiple computing units or multiple cores. The processors 1202 may include the GPU 114 integrated into the CPU 112 or the GPU 114 may be a separate processor device from the CPU 112. The processors 1202 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1202 may be configured to fetch and execute computer-readable instructions stored in the memory 116, mass storage devices 1212, or other computer-readable media.

Memory 116 and mass storage devices 1212 are examples of computer storage media (e.g., memory storage devices) for storing instructions that can be executed by the processors 1202 to perform the various functions described herein. For example, memory 116 may include both volatile memory and non-volatile memory (e.g., RAM, ROM, or the like) devices. Further, mass storage devices 1212 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 1212 may be collectively referred to as memory or computer storage media herein, and may be any type of non-transitory media capable of storing computer-readable, processor-executable program instructions as computer program code that can be executed by the processors 1202 as a particular machine configured for carrying out the operations and functions described in the implementations herein.

The computing device 100 may also include one or more communication interfaces 1206 for exchanging data via a network. The communication interfaces 1206 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1206 can also provide communication with external storage, such as a storage array, network attached storage, storage area network, the cloud storage 232, or the like.

The display devices 102, 104 may be located in the housings 108, 110, respectively, and may be connected using one or more hinges (e.g., the hinges 106 of FIG. 1) or the display devices 102, 104 may be a first portion and a second portion, respectively of foldable OLED display device. The hinges (or the foldable OLED) may enable each display device (or portion of a single display device) to be placed at an angle between about 0 and about 360 relative to the other display device (or portion of a single display device). The display devices 102, 104 may be used for displaying content (e.g., information and images) to users. Other I/O devices 1210 may be devices that receive various inputs from a user and provide various outputs to the user, and may include a keyboard, a touchpad, a mouse, a printer, audio input/output devices, and so forth.

The computer storage media, such as memory 116 and mass storage devices 1212, may be used to store software and data. For example, the computer storage media may be used to store an operating system 1216, one or more applications 1218, the temperature maps 148, the angle 702, one or more remedial actions 1220, ambient light data 1222, sensor data 1224, RGB data 1226, a clock speed 1228 of the processors 1202, fan speeds 1230 (e.g., associated with the fans 166 of FIG. 1).

The first display device 102 may have associated settings 1232(1), and the second display device 104 may have associated settings 1232(2). The settings 1232 may include, for example, RGB levels, calibration curves, brightness levels, contrast levels, color temperatures, and other settings related to the display devices 102, 104.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
   a first housing comprising a first display device and a first set of temperature sensors;
   a second housing comprising a second display device and a second set of temperature sensors;
   one or more hinges coupling the first housing to the second housing to enable the first display device to be placed at an angle between 0 degrees to 360 degrees relative to the second display device;
   one or more processors;
   one or more non-transitory computer readable media storing instructions executable by the one or more processors to perform operations comprising:
   determining the angle between the first display device and the second display device;
   determining a first temperature map of the first housing based at least in part on:

the angle; and
first temperature data received from the first set of temperature sensors;
determining a second temperature map of the second housing based at least in part on:
the angle; and
second temperature data received from the second set of temperature sensors;
determining, based at least in part on the first temperature map and the second temperature map, one or more color differences between the first display device and the second display device;
determining one or more remedial actions based at least in part on the one or more color differences between the first display device and the second display device; and
performing the one or more remedial actions to reduce at least one color difference of the one or more color differences between the first display device and the second display device.

2. The computing device of claim 1, further comprising:
a first ambient light sensor in the first housing; and
a second ambient light sensor in the second housing;
wherein the operations further comprise:
determining first ambient light associated with the first display device based on first ambient light data received from the first ambient light sensor;
determining second ambient light associated with the second display device based on second ambient light data received from the second ambient light sensor;
determining, based at least in part on the first ambient light data and the second ambient light data, an ambient light difference between an amount of ambient light associated with the first display device and with the second display device; and
determining the one or more remedial actions based at least in part on the ambient light difference.

3. The computing device of claim 1, further comprising:
reducing a temperature difference between the first display device and the second display device.

4. The computing device of claim 1, the operations further comprising:
modifying, based on a calibration curve, one or more of a red level, a green level, or a blue level associated with at least one of the first display device or the second display device to reduce a power consumption of the computing device.

5. The computing device of claim 1, wherein the remedial actions comprise at least one of:
increasing a fan speed of at least one fan located in either the first housing or the second housing;
reducing a brightness level of at least one of the first display device or the second display device;
reducing a screen resolution of at least one of the first display device or the second display device;
reducing a clock speed of the one or more processors; or
reducing a number of cores being used by the one or more processors.

6. The computing device of claim 1, wherein the first display device comprises a first organic light emitting diode (OLED) display device and the second display device comprises a second OLED display device.

7. The computing device of claim 1, wherein the first temperature map comprises a plurality of temperature zones.

8. A computing device comprising:
a first housing comprising a first display device, a first set of temperature sensors, and a first set of radiated heat sensors;
a second housing comprising a second display device, a second set of temperature sensors, and second set of radiated heat sensors;
wherein the first housing is coupled to the second housing, enabling the first display device to be placed at an angle between 0 degrees 360 degrees relative to the second display device;
one or more processors;
one or more non-transitory computer readable media storing instructions executable by the one or more processors to perform operations comprising:
determining the angle between the first display device and the second display device;
determining a first temperature map of the first housing based at least in part on:
the angle;
first temperature data received from the first set of temperature sensors; and
first radiated heat data received from the first set of radiated heat sensors;
determining a second temperature map of the second housing based at least in part on:
the angle;
second temperature data received from the second set of temperature sensors; and
second radiated heat data received from the second set of radiated heat sensors;
determining, based at least in part on the first temperature map and the second temperature map, one or more color differences between the first display device and the second display device;
determining one or more remedial actions based at least in part on the one or more color differences between the first display device and the second display device; and
performing the one or more remedial actions to reduce a temperature difference between the first display device and the second display device.

9. The computing device of claim 8, further comprising:
a first ambient light sensor in the first housing; and
a second ambient light sensor in the second housing.

10. The computing device of claim 9, wherein the operations further comprise:
determining first ambient light associated with the first display device based on first ambient light data received from the first ambient light sensor;
determining second ambient light associated with the second display device based on second ambient light data received from the second ambient light sensor;
determining, based at least in part on the first ambient light data and the second ambient light data, an ambient light difference between an amount of ambient light associated with the first display device and with the second display device; and
determining the one or more remedial actions based at least in part on the ambient light difference.

11. The computing device of claim 8, the operations further comprising:
modifying, based on a calibration curve, one or more of a red level, a green level, or a blue level associated with at least one of the first display device or the second display device to reduce a power consumption of the computing device.

12. The computing device of claim 8, wherein the remedial actions comprise at least one of:
increasing a fan speed of at least one fan located in either the first housing or the second housing;
reducing a brightness level of at least one of the first display device or the second display device;
reducing a screen resolution of at least one of the first display device or the second display device;
reducing a clock speed of the one or more processors; or
reducing a number of cores being used by the one or more processors.

13. The computing device of claim 8, wherein the first display device comprises a first portion of an organic light emitting diode (OLED) display device and the second display device comprises a second portion of the OLED display device.

14. A computing device comprising:
a first housing comprising a first display device and a first set of temperature sensors;
a second housing comprising a second display device and a second set of temperature sensors;
wherein the first housing is coupled to the second housing, enabling the first display device to be placed at an angle between 0 degrees to 360 degrees relative to the second display device;
one or more processors;
one or more non-transitory computer readable media storing instructions executable by the one or more processors to perform operations comprising:
determining the angle between the first display device and the second display device;
determining a first temperature map of the first housing based at least in part on:
the angle; and
first temperature data received from the first set of temperature sensors;
determining a second temperature map of the second housing based at least in part on:
the angle; and
second temperature data received from the second set of temperature sensors;
determining, based at least in part on the first temperature map and the second temperature map, a color difference and a color intensity difference between the first display device and the second display device;
determining one or more remedial actions based at least in part on the color difference and the color intensity difference; and
performing the one or more remedial actions to reduce at least one of the color difference or the color intensity difference between the first display device and the second display device.

15. The computing device of claim 14, further comprising:
a first ambient light sensor in the first housing; and
a second ambient light sensor in the second housing.

16. The computing device of claim 15, wherein the operations further comprise:
determining first ambient light associated with the first display device based on first ambient light data received from the first ambient light sensor;
determining second ambient light associated with the second display device based on second ambient light data received from the second ambient light sensor;
determining, based at least in part on the first ambient light data and the second ambient light data, an ambient light difference between an amount of ambient light associated with the first display device and with the second display device; and
determining the one or more remedial actions based at least in part on ambient light difference.

17. The computing device of claim 14, the operations further comprising:
calibrating one or more of a red level, a green level, or a blue level associated with at least one of the first display device or the second display device to reduce a power consumption of the computing device.

18. The computing device of claim 14, wherein the remedial actions comprise at least one of:
increasing a fan speed of at least one fan located in either the first housing or the second housing;
reducing a brightness level of at least one of the first display device or the second display device;
reducing a screen resolution of at least one of the first display device or the second display device;
reducing a clock speed of the one or more processors; or
reducing a number of cores being used by the one or more processors.

19. The computing device of claim 14, wherein the first display device comprises a first portion of an organic light emitting diode (OLED) display device and the second display device comprises a second portion of the OLED display device.

20. The computing device of claim 14, further comprising:
a vapor chamber coupled to the one or more processors; and
a thermal spreader that is coupled to vapor chamber, wherein the vapor chamber includes a graphene layer, and wherein the first housing includes a first portion of the vapor chamber and the second housing includes a second portion of the vapor chamber.

* * * * *